(12) United States Patent
Mueller et al.

(10) Patent No.: US 10,086,686 B2
(45) Date of Patent: Oct. 2, 2018

(54) TRANSMISSION WITH A MODE SELECTION APPARATUS

(71) Applicant: DEERE & COMPANY, Moline, IL (US)

(72) Inventors: David Mueller, Stutensee (DE); Andrew K Rekow, Cedar Falls, IA (US); Thomas H Vu, Cedar Falls, IA (US); Rainer Gugel, Garching (DE); Werner Stettler, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 345 days.

(21) Appl. No.: 14/995,238

(22) Filed: Jan. 14, 2016

(65) Prior Publication Data

US 2017/0203646 A1 Jul. 20, 2017

(51) Int. Cl.
| | |
|---|---|
| *B60W 10/11* | (2012.01) |
| *B60K 6/547* | (2007.10) |
| *B60W 10/113* | (2012.01) |
| *B60W 10/111* | (2012.01) |
| *B60K 6/365* | (2007.10) |

(Continued)

(52) U.S. Cl.
CPC ............. *B60K 6/547* (2013.01); *B60K 6/365* (2013.01); *B60K 6/48* (2013.01); *B60W 10/02* (2013.01); *B60W 10/111* (2013.01); *B60W 10/113* (2013.01); *B60W 10/115* (2013.01); *B60W 20/30* (2013.01); *F16H 3/727* (2013.01); *F16H 37/042* (2013.01); *F16H 61/0204* (2013.01); *B60Y 2200/92* (2013.01); *B60Y 2300/19* (2013.01); *B60Y 2300/70* (2013.01); *B60Y 2400/73* (2013.01); *F16H 2037/049* (2013.01); *F16H 2200/2012* (2013.01);

(Continued)

(58) Field of Classification Search
CPC .............. B60W 10/111; B60W 10/113; B60W 10/115; B60W 10/11
See application file for complete search history.

(56) References Cited

U.S. PATENT DOCUMENTS

| | | |
|---|---|---|
| 5,125,282 A | 6/1992 | Bender et al. |
| 6,440,026 B1 | 8/2002 | Johnson et al. |

(Continued)

FOREIGN PATENT DOCUMENTS

| | | |
|---|---|---|
| EP | 0004045 A1 | 9/1979 |
| EP | 2126412 B1 | 12/2000 |

(Continued)

*Primary Examiner* — William Kelleher
*Assistant Examiner* — Gregory T Prather

(57) ABSTRACT

In accordance with an example embodiment, a transmission may include a first mode in which a low range clutch is engaged and a first synchronizer is in a first engaged condition causing an output shaft to rotate relative to a first range shaft based upon a ratio of a first range gear to a second range gear. The transmission may include a second mode in which a high range clutch is engaged and a second synchronizer is in a first engaged condition causing the output shaft to rotate relative to a second range shaft based upon a ratio of the first range gear to the second range gear. A shift from the first mode to the second mode includes engaging the second synchronizer in the first engaged condition before disengaging the low range clutch and engaging the high range clutch.

14 Claims, 15 Drawing Sheets

(51) Int. Cl.
*B60K 6/48* (2007.10)
*B60W 10/02* (2006.01)
*B60W 10/115* (2012.01)
*B60W 20/30* (2016.01)
*F16H 3/72* (2006.01)
*F16H 37/04* (2006.01)
*F16H 61/02* (2006.01)

(52) U.S. Cl.
CPC ... *F16H 2200/2041* (2013.01); *Y10S 903/911* (2013.01); *Y10S 903/919* (2013.01); *Y10S 903/945* (2013.01)

(56) References Cited

U.S. PATENT DOCUMENTS

| | | |
|---|---|---|
| 7,070,534 B2 | 7/2006 | Pelouch |
| 7,621,893 B2 | 11/2009 | Moberg et al. |
| 7,913,581 B2 | 3/2011 | Jackson |
| 7,938,208 B2 * | 5/2011 | Oba ................ B60K 6/365 180/65.225 |
| 8,230,753 B2 | 7/2012 | Jackson |
| 8,234,956 B2 | 8/2012 | Love et al. |
| 8,337,352 B2 | 12/2012 | Morrow et al. |
| 8,784,246 B2 | 7/2014 | Treichel et al. |
| 8,864,613 B2 | 10/2014 | Morrow et al. |
| 9,067,493 B2 | 6/2015 | Husson et al. |
| 2003/0171186 A1 * | 9/2003 | Okada ................ B60K 31/04 477/71 |
| 2004/0025612 A1 * | 2/2004 | Ahnert ................ B60W 10/02 74/329 |
| 2007/0142168 A1 * | 6/2007 | DeMarco ............ B60W 30/194 477/41 |
| 2008/0188342 A1 | 8/2008 | Jackson |
| 2010/0029432 A1 | 2/2010 | Jackson |
| 2010/0032218 A1 * | 2/2010 | Ideshio ................ B60K 6/365 180/65.225 |
| 2010/0062898 A1 * | 3/2010 | Iwao ................ B60W 10/06 477/80 |
| 2010/0113213 A1 * | 5/2010 | Oba ................ B60K 6/365 477/5 |
| 2011/0162483 A1 | 7/2011 | Jackson |
| 2013/0001944 A1 | 1/2013 | Hickam et al. |
| 2013/0060411 A1 * | 3/2013 | Kaltenbach ........... B60W 10/08 701/22 |
| 2013/0239749 A1 * | 9/2013 | Lee ................ B60K 6/36 74/665 B |
| 2014/0171263 A1 * | 6/2014 | Steinborn ............ F16H 61/702 477/79 |
| 2014/0221155 A1 | 8/2014 | Petrigliano |
| 2014/0235405 A1 * | 8/2014 | Mori ................ B60W 10/11 477/77 |
| 2015/0031491 A1 | 1/2015 | Otten et al. |
| 2015/0072823 A1 | 3/2015 | Rintoo |
| 2015/0183436 A1 | 7/2015 | Rekow et al. |
| 2015/0183438 A1 * | 7/2015 | Park ................ B60W 10/02 701/22 |
| 2015/0184726 A1 | 7/2015 | Rekow et al. |
| 2015/0219214 A1 * | 8/2015 | Kawannoto ............ F02D 17/00 701/51 |
| 2015/0292606 A1 * | 10/2015 | Lubke ................ B60K 6/48 74/661 |
| 2015/0352942 A1 * | 12/2015 | Kaltenbach ........... B60K 6/365 477/5 |
| 2016/0137189 A1 * | 5/2016 | Zhu ................ B60W 20/30 477/5 |
| 2017/0096137 A1 * | 4/2017 | Toyama ................ B60K 6/365 |

FOREIGN PATENT DOCUMENTS

| | | |
|---|---|---|
| EP | 2444697 A1 | 4/2012 |
| WO | 20120171815 A1 | 12/2012 |

* cited by examiner

| Upshifts | | Clutches | | Synchronizers | | | Range Shafts | | Gears | | | | | | | | |
|---|---|---|---|---|---|---|---|---|---|---|---|---|---|---|---|---|---|
| Modes | Ranges | $C_{Lo}$ | $C_{Hi}$ | $S_{BLo}$ | $S_{BHi}$ | $S_{AC}$ | Low | High | G5 | G6 | $G7_1$ | $G8_1$ | $G7_2$ | $G8_2$ | G9 | G10 |
| M1 | $A_{Lo}$ | X | | AC | $AC^*$ | A | X | | | | | | | | | |
| | $A_{Hi}$ | | X | $B_{Lo}^*$ | AC | A | | X | | | | | | | X | X |
| M3 | $B_{Lo}$ | X | | $B_{Lo}$ | $B_{Hi}^*$ | – | X | | | | X | X | | | | |
| M4 | $B_{Hi}$ | | X | $AC^*$ | $B_{Hi}$ | $C^*$ | | X | | | | | X | X | | |
| M5 | $C_{Lo}$ | X | | AC | $AC^*$ | C | X | | X | X | | | | | | |
| M6 | $C_{Hi}$ | | X | $AC^*$ | AC | C | | X | X | X | | | | | | |

FIG. 3A

| Downshifts | | Clutches | | Synchronizers | | | Range Shafts | | Gears | | | | | | | | |
|---|---|---|---|---|---|---|---|---|---|---|---|---|---|---|---|---|---|
| Modes | Ranges | $C_{Lo}$ | $C_{Hi}$ | $S_{BLo}$ | $S_{BHi}$ | $S_{AC}$ | Low | High | G5 | G6 | $G7_1$ | $G8_1$ | $G7_2$ | $G8_2$ | G9 | G10 |
| M1 | $A_{Lo}$ | X | | AC | $AC^*$ | A | X | | | | | | | | | |
| M2 | $A_{Hi}$ | | X | $AC^*$ | AC | A | | X | | | | | | | X | X |
| M3 | $B_{Lo}$ | X | | $B_{Lo}$ | $AC^*$ | $A^*$ | X | | | | X | X | | | | |
| M4 | $B_{Hi}$ | | X | $B_{Lo}^*$ | $B_{Hi}$ | – | X | | | | | | X | X | | |
| M5 | $C_{Lo}$ | X | | AC | $B_{Hi}^*$ | C | X | | X | X | | | | | | |
| M6 | $C_{Hi}$ | | X | $AC^*$ | AC | C | | X | X | X | | | | | | |

FIG. 3B

FIG. 7A — Upshifts

| Modes | Ranges | Clutches | | Synchronizers | | | | Range Shafts | | Gears | | | | | | | | | |
|---|---|---|---|---|---|---|---|---|---|---|---|---|---|---|---|---|---|---|---|
| | | $C_{Lo}$ | $C_{Hi}$ | $S_{Lo}$ | $S_{Hi}$ | $S_{BLo}$ | $S_{BHi}$ | Low | High | $G5_1$ | $G6_1$ | $G5_2$ | $G6_2$ | G7 | G8 | $G9_1$ | $G10_1$ | $G9_2$ | $G10_2$ |
| M1 | $A_{Lo}$ | X | | $A_{Lo}$ | $A_{Hi}*$ | — | — | X | | | | | | | | X | | | |
| M2 | $A_{Hi}$ | | X | — | $A_{Hi}$ | $B*$ | — | | X | | | | | | | | | X | |
| M3 | $B_{Lo}$ | X | | — | — | B | $B*$ | X | | | | | | X | X | | | | |
| M4 | $B_{Hi}$ | | X | — | — | — | B | | X | | | | | X | X | | | | |
| M5 | $C_{Lo}$ | X | | $C_{Lo}*$ | $C_{Hi}*$ | — | — | X | | X | X | | | | | | | | |
| M6 | $C_{Hi}$ | | X | $C_{Lo}*$ | $C_{Hi}$ | — | — | | X | | | X | X | | | | | | |

FIG. 7B — Downshifts

| Modes | Ranges | Clutches | | Synchronizers | | | | Range Shafts | | Gears | | | | | | | | | |
|---|---|---|---|---|---|---|---|---|---|---|---|---|---|---|---|---|---|---|---|
| | | $C_{Lo}$ | $C_{Hi}$ | $S_{Lo}$ | $S_{Hi}$ | $S_{BLo}$ | $S_{BHi}$ | Low | High | $G5_1$ | $G6_1$ | $G5_2$ | $G6_2$ | G7 | G8 | $G9_1$ | $G10_1$ | $G9_2$ | $G10_2$ |
| M1 | $A_{Lo}$ | X | | $A_{Lo}$ | $A_{Hi}*$ | — | — | X | | | | | | | | X | | | |
| M2 | $A_{Hi}$ | | X | $A_{Lo}*$ | $A_{Hi}$ | — | — | | X | | | | | | | | | X | |
| M3 | $B_{Lo}$ | X | | — | $A_{Hi}*$ | B | — | X | | | | | | X | X | | | | |
| M4 | $B_{Hi}$ | | X | — | — | $B*$ | B | | X | | | | | X | X | | | | |
| M5 | $C_{Lo}$ | X | | $C_{Lo}$ | — | — | — | X | | X | X | | | | | | | | |
| M6 | $C_{Hi}$ | | X | $C_{Lo}*$ | $C_{Hi}$ | — | — | | X | | | X | X | | | | | | |

Upshifts

| Modes | Ranges | Clutches | | Synchronizers | | Range Shafts | | Gears | | | | | |
|---|---|---|---|---|---|---|---|---|---|---|---|---|---|
| | | $C_{Lo}$ | $C_{Hi}$ | $S_{Lo}$ | $S_{Hi}$ | Low | High | G7 | G8 | $G9_1$ | $G10_1$ | $G9_2$ | $G10_2$ |
| M1 | $A_{Lo}$ | X | | $A_{Lo}$ | $A_{Hi}*$ | X | | | | X | | | |
| M2 | $A_{Hi}$ | | X | $B*$ | $A_{Hi}$ | | X | | | | | X | |
| M3 | $B_{Lo}$ | X | | B | $B*$ | X | | X | X | | | | |
| M4 | $B_{Hi}$ | | X | $B*$ | B | | X | X | X | | | | |

FIG. 11B

Downshifts

| Modes | Ranges | Clutches | | Synchronizers | | Range Shafts | | Gears | | | | | |
|---|---|---|---|---|---|---|---|---|---|---|---|---|---|
| | | $C_{Lo}$ | $C_{Hi}$ | $S_{Lo}$ | $S_{Hi}$ | Low | High | G7 | G8 | $G9_1$ | $G10_1$ | $G9_2$ | $G10_2$ |
| M1 | $A_{Lo}$ | X | | $A_{Lo}$ | $A_{Hi}*$ | X | | | | X | | | |
| M2 | $A_{Hi}$ | | X | $A_{Lo}*$ | $A_{Hi}$ | | X | | | | | X | |
| M3 | $B_{Lo}$ | X | | B | $A_{Hi}*$ | X | | X | X | | | | |
| M4 | $B_{Hi}$ | | X | $B*$ | B | | X | X | X | | | | |

TRANSMISSION WITH A MODE SELECTION APPARATUS

CROSS-REFERENCE TO RELATED APPLICATIONS

N/A

FIELD OF THE DISCLOSURE

The present disclosure relates to transmissions having a mode or range selection apparatus.

BACKGROUND

Transmissions are used in vehicles or work machines such as, agricultural, construction, off-road, and industrial machines, for example. Transmissions used in work machines typically provide a large number of gear ratios for propelling the vehicle. A transmission may include a main gear selection unit and a range gear selection unit, or range box. The range gear selection unit includes one or more range gears which operate the transmission in one or more ranges. For each range, the gears in the main gear selection unit interact with the respective range gear.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a transmission may include an input shaft, a first range shaft, a second range shaft, and an output shaft. The transmission may include a low range gearing and a high range gearing operably connected to the input shaft. The transmission may include a low range clutch having an engaged condition which operably connects the low range gearing to the first range shaft, a high range clutch having an engaged condition which operably connects the high range gearing to the second range shaft. The transmission may include a first range gear operably connected to one of the first range shaft and the second range shaft, the first range gear engaged with a second range gear operably connected to the output shaft. The transmission may include a first synchronizer and a second synchronizer each having a first engaged condition. The transmission may include a first mode in which the low range clutch in the engaged condition and the first synchronizer in the first engaged condition causing the output shaft to rotate relative to the first range shaft based upon a ratio of the first range gear to the second range gear. The transmission may include a second mode in which the high range clutch in the engaged condition and the second synchronizer in the first engaged condition causing the output shaft to rotate relative to the second range shaft based upon a ratio of the first range gear to the second range gear. A shift from the first mode to the second mode may include engaging the second synchronizer in the first engaged condition before disengaging the low range clutch and engaging the high range clutch.

According to an aspect of the present disclosure, a transmission may include an input shaft, a first range shaft, a second range shaft, and an output shaft. The transmission may include a low range gearing and a high range gearing operably connected to the input shaft. The transmission may include a low range clutch having an engaged condition which operably connects the low range gearing to the first range shaft, and a high range clutch having an engaged condition which operably connects the high range gearing to the second range shaft. The transmission may include a first range gear operably connected to the first range shaft and engaged with a second range gear operably connected to the output shaft. The transmission may include a third range gear operably connected to the first range shaft and engaged with a fourth range gear operably connected to the output shaft. The transmission may include a first synchronizer and a second synchronizer each having a first engaged condition. The transmission may include a first mode which includes the low range clutch in the engaged condition and the first synchronizer in the first engaged condition causing the output shaft to rotate relative to first range shaft based upon a ratio of the first range gear to the second range gear. The transmission may include a second mode which includes the high range clutch in the engaged condition and the second synchronizer in the first engaged condition causing the output shaft to rotate relative to second range shaft based upon a ratio of the third range gear to the fourth range gear. A shift from the first mode to the second mode may include engaging the second synchronizer in the first engaged condition before disengaging the low range clutch and engaging the high range clutch.

According to an aspect of the present disclosure, a method of shifting ranges within a transmission may include determining an intention to change from a first mode to a second mode in the transmission; determining the first mode of the transmission, which includes a first range clutch in an engaged condition and a first synchronizer in a first engaged condition; determining the second mode of the transmission, which includes a second range clutch in an engaged condition and a second synchronizer in a first engaged condition; engaging the second synchronizer in the first engaged condition; disengaging the first range clutch; engaging the second range clutch; and disengaging the first synchronizer from the first engaged condition.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 3A is a diagram illustrating the modes or ranges of a transmission for upshifts, according to the first embodiment;

FIG. 3B is a diagram illustrating the modes or ranges of a transmission for downshifts, according to the first embodiment;

FIG. 7A is a diagram illustrating the modes or ranges of a transmission for upshifts, according to the second embodiment;

FIG. 7B is a diagram illustrating the modes or ranges of a transmission for downshifts, according to the second embodiment;

FIG. 11A is a diagram illustrating the modes or ranges of a transmission for upshifts, according to the third embodiment;

FIG. 11B is a diagram illustrating the modes or ranges of a transmission for downshifts, according to the third embodiment;

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
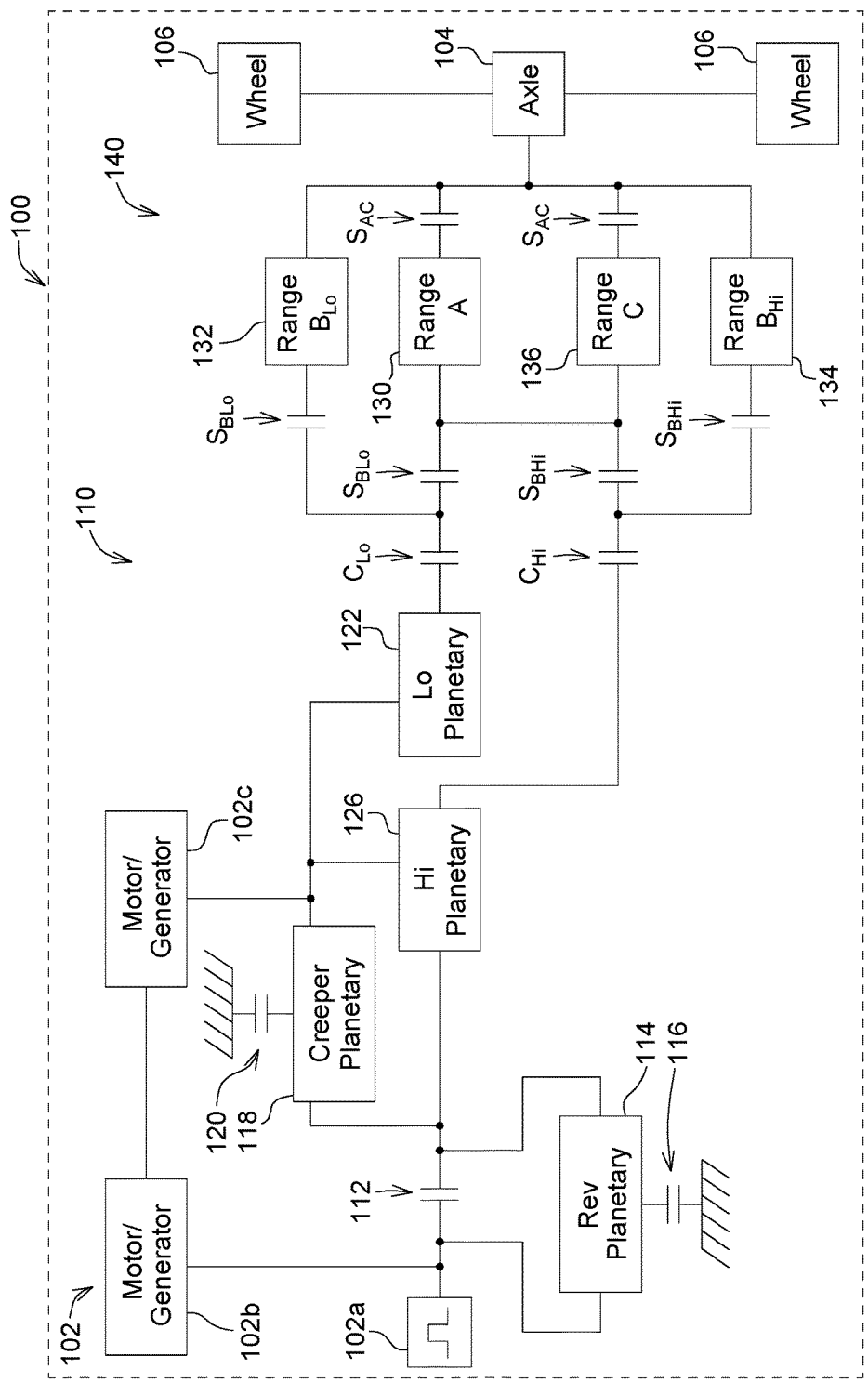
FIG. 1 is a schematic diagram of a powertrain for a vehicle, according to a first embodiment.
Figure 2:
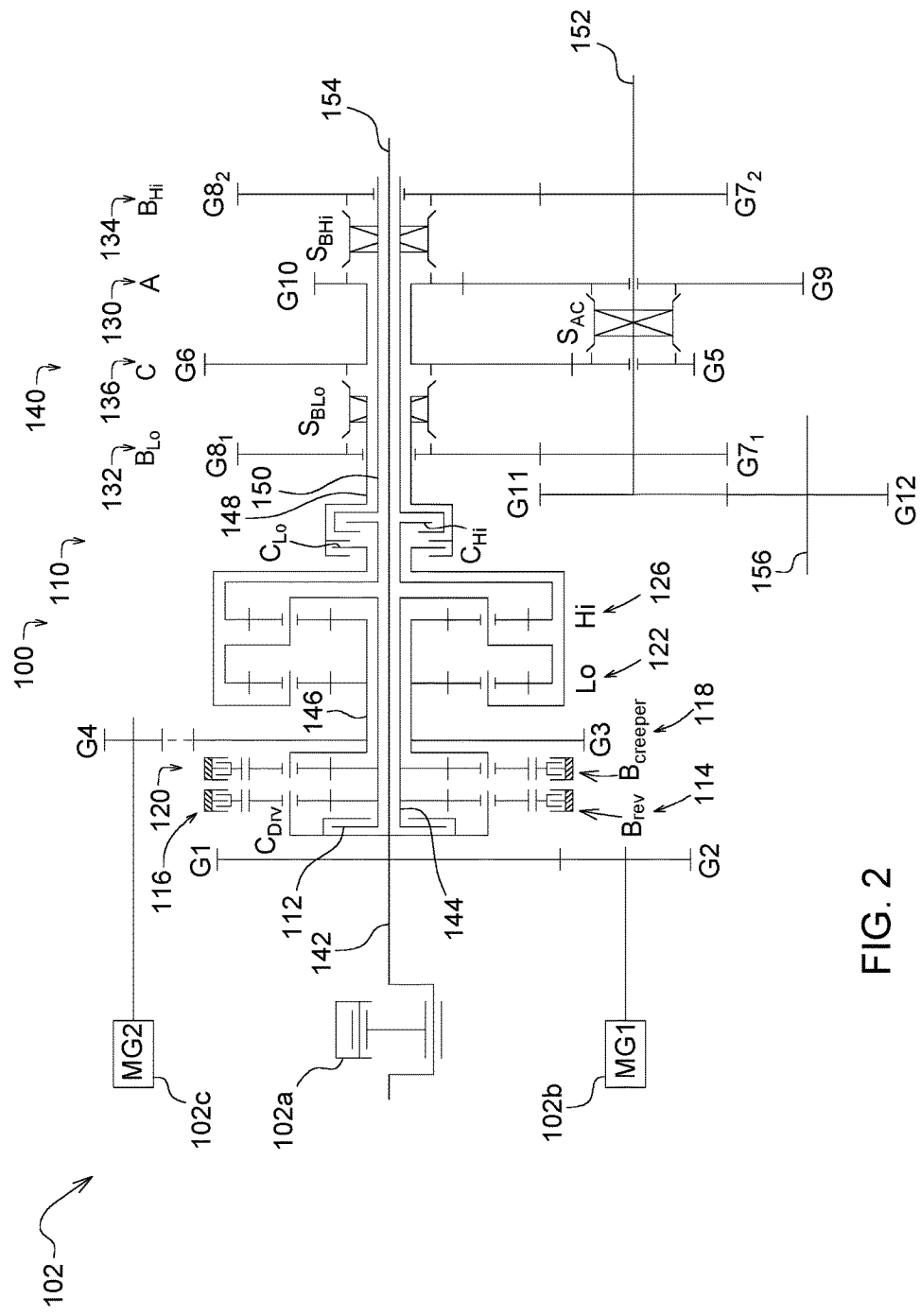
FIG. 2 is a schematic diagram of a powertrain for a vehicle, according to the first embodiment.

FIGS. 1 and 2 illustrate a powertrain 100 for a vehicle or work machine, including but not limited to agricultural, construction, and industrial machines, according to one embodiment. The powertrain 100 also applies to other powered or motorized vehicles, machines, or equipment. The powertrain 100 may include one or more power sources 102, such as an internal combustion engine 102a, a first motor-generator (MG1) 102b, a second motor-generator (MG2) 102c, and other known power sources. The motor-generators can be hydraulic, pneumatic, or electric. The motor-generators can provide power to the powertrain 100 or they can generate power. The second motor-generator (MG2) 102c can be a variator. The powertrain 100 may include a transmission 110, one or more axles 104, and one or more ground engaging apparatus, such as wheels or tracks 106. The powertrain 100 may include one or more clutches, gear arrangements or gearings, drive shafts, final drives, and other drivetrain components connecting the various apparatus. Any of these components may be separate to or integral with the transmission 110. The transmission 110 may include a housing, which provides an enclosure for the various transmission components. One or more of the shafts or other transmission components may be rotatably connected to or supported by the housing of the transmission 110.

The transmission 110 may include an input shaft 142, a first intermediate shaft 144, and a second intermediate shaft 146. The input shaft 142 may include a first input gear G1. The first motor-generator 102b may include a second input gear G2. The first motor-generator 102b may connect to the input shaft 142 of the transmission 110 through the engaging or meshing of the first input gear G1 with the second input gear G2. The second intermediate shaft 146 may include a third input gear G3. The second motor-generator 102c may include a fourth input gear G4. The second motor-generator 102c may connect to the second intermediate shaft 146 of the transmission 110 through the engaging or meshing of the third input gear G3 with the fourth input gear G4. The second motor-generator 102c may operate as a variator for the transmission 110. The second motor-generator 102c may operable connect to a low range planetary (Lo) 122 and a high range planetary (Hi) 126.

The transmission 110 may include a drive clutch ($C_{Drv}$) 112, which selectively connects a power source 102 to one or more apparatus in the powertrain 100. The drive clutch 112 may selectively connect the input shaft 142 of the transmission 110 with the first intermediate shaft 144. The transmission 110 may include a reverse clutch 116, which selectively engages a reverse gearing or planetary ($B_{rev}$) 114 with the input shaft 142 and the first intermediate shaft 144. The transmission 110 may include a creeper clutch 120, which selectively engages a creeper gearing or planetary ($B_{creeper}$) 118 with the first intermediate shaft 144 and the second intermediate shaft 146.

The transmission 110 may include a low range clutch $C_{Lo}$, which operably connects or couples a low range gearing or planetary (Lo) 122 with a first range shaft 148 in an engaged position or condition. The transmission 110 may include a high range clutch $C_{Hi}$, which operably connects or couples a high range gearing or planetary (Hi) 126 with a second range shaft 150 in an engaged position or condition. The first and second range shafts 148, 150 may be coaxial. The first and second range shafts 148, 150 may be concentric. The second range shaft 150 may be positioned within or partially within the first range shaft 148. For a non-limiting example, the first range shaft 148 may be hollow or partially hollow and the second range shaft 150 may be positioned inside or partially inside the first range shaft 148.

The transmission 110 may include an A gear arrangement or gearing 130 having a first range gear G10 engaging or meshing with a second range gear G9. The first range gear G10 may be rotatably connected to or mounted about the first range shaft 148 or the second range shaft 150. The first range gear G10 may be releasably coupled or fixed to either the first range shaft 148 or the second range shaft 150. The second range gear G9 may be rotatably connected to or mounted about the output shaft 152. The second range gear G9 may be releasably coupled or fixed to the output shaft 152. In some implementations, a gear or other transmission component which is rotatably connected to or mounted about a shaft can rotate relative to or independently of the shaft until a clutch, synchronizer, or other device releasably connects or fixes the gear to the shaft.

The transmission 110 may include a $B_{Lo}$ gear arrangement or gearing 132 having a third range gear $G8_1$ engaging or meshing with a fourth range gear $G7_1$. The third range gear $G8_1$ may be rotatably connected to or mounted about the first range shaft 148. The fourth range gear $G7_1$ may be fixedly connected to or mounted about the output shaft 152. In some implementations, a gear or other transmission component which is fixedly connected to or mounted about a shaft rotates with the shaft.

The transmission 110 may include a $B_{Hi}$ gear arrangement or gearing 134 having a fifth range gear $G8_2$ engaging or meshing with a sixth range gear $G7_2$. The fifth range gear $G8_2$ may be rotatably connected to or mounted about the second range shaft 150. The sixth range gear $G7_2$ may be fixedly connected to or mounted about the output shaft 152.

The transmission 110 may include a C gear arrangement or gearing 136 having a seventh range gear G6 engaging or meshing with an eighth range gear G5. The seventh range gear G6 may be rotatably connected to or mounted about the first range shaft 148 or the second range shaft 150. The seventh range gear G6 may be releasably coupled or fixed to the first range shaft 148 or the second range shaft 150. The eighth range gear G5 may be rotatably connected to or mounted about the output shaft 152. The eighth range gear G5 may be releasably coupled or fixed to the output shaft 152. The seventh range gear G6 may be fixedly connected or attached to the first range gear G10.

The transmission 110 may include a first synchronizer $S_{BLo}$, which selectively engages the $B_{Lo}$ gearing 132 or the A and C gearings 130, 136. The first synchronizer $S_{BLo}$ may be connected to or mounted about the first range shaft 148. The first synchronizer $S_{BLo}$ may have three positions or conditions: a disengaged position, a first engaged position with the A and C gearings 130, 136, or a second engaged position with the $B_{Lo}$ gearing 132.

The transmission 110 may include a second synchronizer $S_{BHi}$, which selectively engages the $B_{Hi}$ gearing 134 or the A and C gearings 130, 136. The second synchronizer $S_{BHi}$, may be fixedly connected to or mounted about the second range shaft 150. The second synchronizer $S_{BHi}$ may have three positions or conditions: a disengaged position, a first engaged position with the A and C gearings 130, 136, or a second engaged position with the $B_{Hi}$ gearing 134.

The transmission 110 may include a third synchronizer $S_{AC}$, which selectively engages the A gearing 130 or the C gearing 136. The third synchronizer $S_{AC}$ may be fixedly connected to or mounted about the output shaft 152. The third synchronizer $S_{AC}$ may have three positions or conditions: a disengaged position, a first engaged position with the A gearing 130, or a second engaged position with the C gearing 136.

The first synchronizer $S_{BLo}$ may selectively engage the A and C gearings 130, 136 by releasably coupling or fixing the seventh range gear G6 to the first range shaft 148 causing the seventh range gear G6 and the first range gear G10 to rotate with the first range shaft 148, which causes the eighth range gear G5 and the second range gear G9 to rotate. If the third synchronizer $S_{AC}$ is selectively engaged with the A gearing 130, then the third synchronizer $S_{AC}$ releasably connects or fixes the second range gear G9 to the output shaft 152 causing the output shaft 152 to rotate with the second range gear G9. This causes the output shaft 152 to rotate at a speed relative to the first range shaft 148 based upon the ratio of first range gear G10 to the second range gear G9. If the third synchronizer $S_{AC}$ is selectively engaged with the C gearing 136, then the third synchronizer $S_{AC}$ releasably connects or fixes the eighth range gear G5 to the output shaft 152 causing the output shaft 152 to rotate with the eighth range gear G5. This causes the output shaft 152 to rotate at a speed relative to the first range shaft 148 based upon the ratio of seventh range gear G6 to the eighth range gear G5.

The first synchronizer $S_{BLo}$ may selectively engage the $B_{Lo}$ gearing 132 by releasably coupling or fixing the third range gear $G8_1$ to the first range shaft 148 causing the third range gear $G8_1$ to rotate with the first range shaft 148, which causes the fourth range gear $G7_1$ to rotate. This causes the output shaft 152 to rotate at a speed relative to the first range shaft 148 based upon the ratio of third range gear $G8_1$ to the fourth range gear $G7_1$.

The second synchronizer $S_{BHi}$ may selectively engage the A gearing 130 and the C gearing 136 by releasably coupling or fixing the first range gear G10 to the second range shaft 150 causing the first range gear G10 and the seventh range gear G6 to rotate with the second range shaft 150, which causes the second range gear G9 and the eighth range gear G5 to rotate. If the third synchronizer $S_{AC}$ is selectively engaged with the A gearing 130, then the third synchronizer $S_{AC}$ releasably connects or fixes the second range gear G9 to the output shaft 152 causing the output shaft 152 to rotate with the second range gear G9. This causes the output shaft 152 to rotate at a speed relative to the second range shaft 150 based upon the ratio of first range gear G10 to the second range gear G9. If the third synchronizer $S_{AC}$ is selectively engaged with the C gearing 136, then the third synchronizer $S_{AC}$ releasably connects or fixes the eighth range gear G5 to the output shaft 152 causing the output shaft 152 to rotate with the eighth range gear G5. This causes the output shaft 152 to rotate at a speed relative to the second range shaft 150 based upon the ratio of seventh range gear G6 to the eighth range gear G5.

The second synchronizer $S_{BHi}$ may selectively engage the $B_{Hi}$ gearing 134 by releasably coupling or fixing the fifth range gear $G8_2$ to the second range shaft 150 causing the fifth range gear $G8_2$ to rotate with the second range shaft 150, which causes the sixth range gear $G7_2$ to rotate. This causes the output shaft 152 to rotate at a speed relative to the second range shaft 150 based upon the ratio of fifth range gear $G8_2$ to the sixth range gear $G7_2$.

The transmission 110 may include a mode or range selection apparatus 140 coupled to or integral with the transmission 110. Alternatively, the range selection apparatus 140 could be separate from the transmission. The range selection apparatus 140 may include one or more of the preceding components. In one embodiment, the range selection apparatus 140 includes the low and high range clutches Lo, Hi; the first, second, and third synchronizers $S_{BLo}$, $S_{BHi}$, $S_{AC}$; the first and second range shafts 148, 150; the output shaft 152; and the A, $B_{Lo}$, $B_{Hi}$, and C gearings 130, 132, 134, 136. The transmission 110 may include a power take off (PTO) shaft 154, a reverse shaft 156, and first and second reverse gears G11, G12.

FIG. 3A illustrates the modes or ranges of the transmission 110 during upshifts, and FIG. 3B illustrates the modes or ranges of the transmission 110 during downshift, which illustrates the power flow from the low and high range clutches $C_{Lo}$, $C_{Hi}$ to the output shaft 152, according to some embodiments. For each mode or range, one of the low range clutch $C_{Lo}$ or high range clutch $C_{Hi}$ is engaged, one or more of the synchronizers are engaged, and one or more synchronizers are preselected or pre-engaged. The synchronizers can be preselected or pre-engaged prior to the start of an upshift or downshift, or they can be preselected or pre-engaged at the start of the upshift or downshift. As depicted in FIGS. 3A and 3B, the synchronizers which are preselected or pre-engaged are indicated in italics with an asterisk. After the one or more synchronizers are preselected or pre-engaged for the corresponding mode or range upshift or downshift, then during the shift one of the low range clutch $C_{Lo}$ or high range clutch $C_{Hi}$ is disengaged and the other is engaged.

For example, in a first mode M1 or first range $A_{Lo}$, the low range clutch $C_{Lo}$ is engaged, the first synchronizer $S_{BLo}$ is engaged with the seventh range gear G6 of the C gearing 136 and the first range gear G10 of the A gearing 130, and the third synchronizer $S_{AC}$ is engaged with the second range gear G9 of the A gearing 130. When the first synchronizer $S_{BLo}$ is engaged with the seventh range gear G6 of the C gearing 136, the first synchronizer $S_{BLo}$ is also engaged with the first range gear G10 of the A gearing 130 because seventh range gear G6 is fixedly connected to first range gear G10, in this embodiment. The second synchronizer $S_{BHi}$ may be preselected or pre-engaged with the first range gear G10 of the A gearing 130 and the seventh range gear G6 of the C gearing 136.

Figure 4:
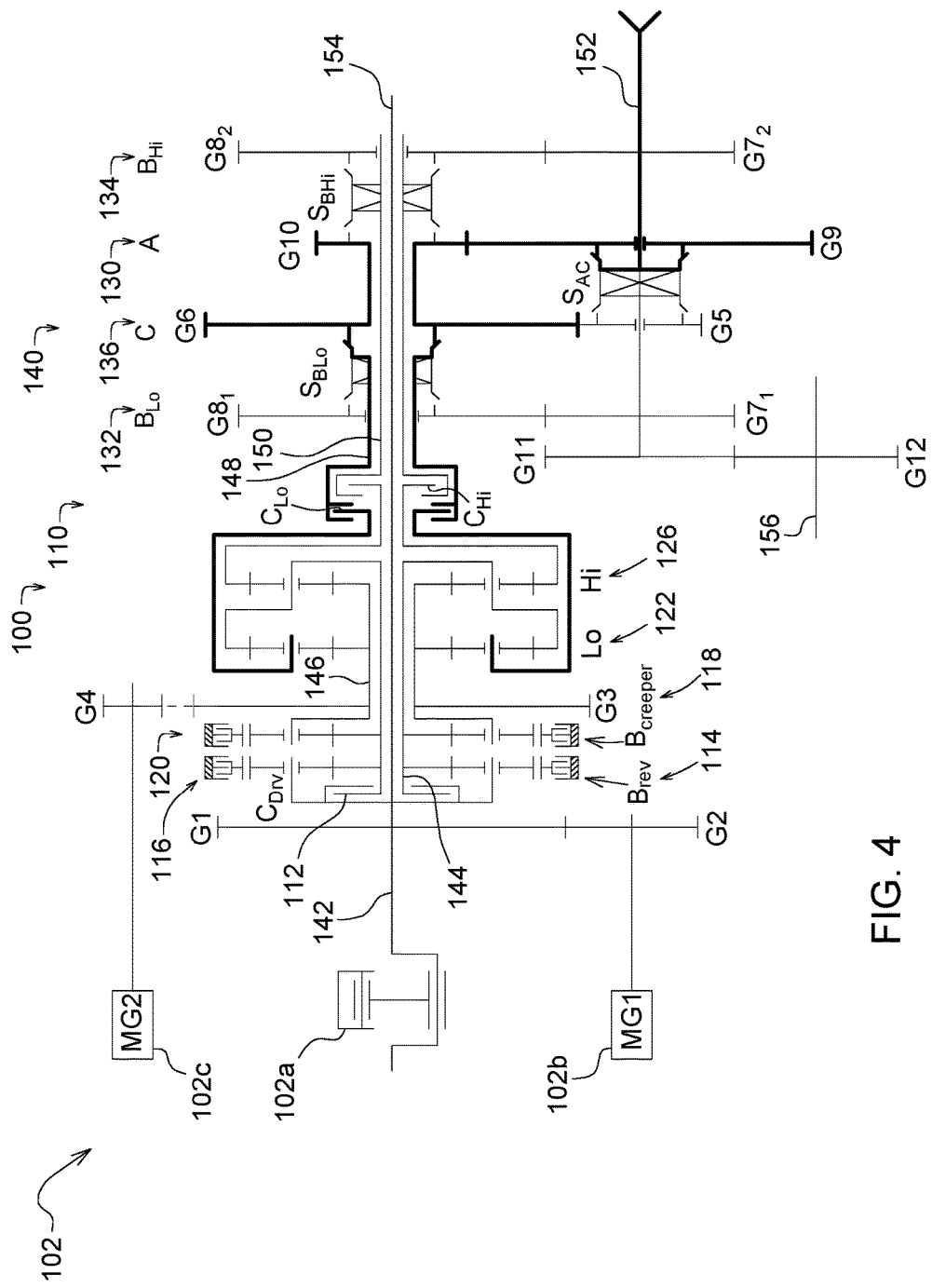
FIG. 4 is a schematic diagram of a powertrain for a vehicle, according to the first embodiment.

In the first mode M1 or first range $A_{Lo}$, the power flows from the low range gearing or planetary (Lo) 122 to the output shaft 152, as shown in FIG. 4. The power flows from the low range gearing (Lo) 122 to the low range shaft 148 via the engaged low range clutch $C_{Lo}$. The power then flows from the low range shaft 148 to the first range gear G10 via the engaged first synchronizer $S_{BLo}$. The power then flows from the first range gear G10 to the engaged or meshed second range gear G9. The power then flows from the second range gear G9 to the output shaft 152 via the engaged third synchronizer $S_{AC}$. Even when the second synchronizer $S_{BHi}$ is pre-engaged with the first range gear G10 of the A gearing 130, no power flows through this path in the first mode M1 or first range $A_{Lo}$ because the high range clutch $C_{Hi}$ is disengaged.

Prior to an upshift from the first mode M1 or range $A_{Lo}$ to a second mode M2 or range $A_{Hi}$, the second synchronizer $S_{BHi}$ is pre-engaged with the first range gear G10 of the A gearing 130 and the seventh range gear G6 of the C gearing 136. When the second synchronizer $S_{BHi}$ is engaged with the first range gear G10 of the A gearing 130, the second synchronizer $S_{BHi}$ is also engaged with seventh range gear G6 of the C gearing 136 because seventh range gear G6 is fixedly connected to first range gear G10, in this embodiment.

For the upshift between the first mode M1 or first range $A_{Lo}$ and a second mode M2 or second range $A_{Hi}$ the low range clutch $C_{Lo}$ is disengaged and the high range clutch $C_{Hi}$ is engaged. The synchronizers do not need to be engaged or disengaged at the same time the low and high range clutches $C_{Lo}$, $C_{Hi}$ are being disengaged and engaged because the second synchronizer $S_{BHi}$ was pre-engaged with the A gearing 130 before the upshift started. Alternatively, the second synchronizer $S_{BHi}$ can be pre-engaged at the beginning of the upshift. When the upshift is complete, the first synchronizer $S_{BLo}$ can be disengaged from the A and C gearings 130, 136.

In the second mode M2 or second range $A_{Hi}$, the second synchronizer $S_{BHi}$ is engaged with the A and C gearings 130, 136 and the third synchronizer $S_{AC}$ is engaged with the A gearing 130. From the second mode M2 or second range $A_{Hi}$, the transmission 110 can be upshifted to a third mode M3 or third range $B_{Lo}$ or downshifted to the first mode M1 or first range $A_{Lo}$. Prior to the upshift to the third mode M3 or third range $B_{Lo}$ from the second mode M2 or second range $A_{Hi}$, the first synchronizer $S_{BLo}$ is pre-engaged with the gear G8 of the $B_{Lo}$ gearing 132. Then during the upshift, the high range clutch $C_{Hi}$ is disengaged and the low range clutch $C_{Lo}$ is engaged. As stated above, the synchronizers do not need to be engaged or disengaged at the same time the low and high range clutches $C_{Lo}$, $C_{Hi}$ are being engaged and disengaged because the first synchronizer $S_{BLo}$ was pre-engaged before the upshift started. When the upshift is complete, the second and third synchronizers $S_{BHi}$, $S_{AC}$ can be disengaged or they can remain engaged.

Prior to the downshift to the first mode M1 or first range $A_{Lo}$ from the second mode M2 or second range $A_{Hi}$, the first synchronizer $S_{BLo}$ is pre-engaged with the seventh range gear G6 of the C gearing 136 and the first range gear G10 of the A gearing 130. Then during the downshift, the high range clutch $C_{Hi}$ is disengaged and the low range clutch $C_{Lo}$ is engaged. Again, the synchronizers do not need to be engaged or disengaged at the same time the low and high range clutches $C_{Lo}$, $C_{Hi}$ are being engaged and disengaged because the first synchronizer $S_{BLo}$ was pre-engaged before the downshift started. When the downshift is complete, the second synchronizer $S_{BHi}$ can be disengaged or remain engaged in anticipation of an upshift to the second mode M2 or second range $A_{Hi}$.

In the third mode M3 or range $B_{Lo}$, the first synchronizer $S_{BLo}$ is engaged with the $B_{Lo}$ gearing 132. From the third mode M3 or range $B_{Lo}$, the transmission 110 can be upshifted to the fourth mode M4 or range $B_{Hi}$ or downshifted to the second mode M2 or range $A_{Hi}$. Prior to the upshift to the fourth mode M4 or range $B_{Hi}$, the second synchronizer $S_{BHi}$ is pre-engaged with the $B_{Hi}$ gearing 134. Prior to the downshift to the second mode M2 or range $A_{Hi}$, the second synchronizer $S_{BHi}$ is pre-engaged with the A and C gearings 130, 136 and the third synchronizer $S_{AC}$ is pre-engaged with the A gearing 130.

In the fourth mode M4 or range $B_{Hi}$, the second synchronizer $S_{BHi}$ is engaged with the $B_{Hi}$ gearing 134. From the fourth mode M4 or range $B_{Hi}$, the transmission 110 can be upshifted to the fifth mode M5 or range $C_{Lo}$ or downshifted to the third mode M3 or range $B_{Lo}$. Prior to the upshift to the fifth mode M5 or range $C_{Lo}$, the first synchronizer $S_{BLo}$ is pre-engaged with the A and C gearings 130, 136 and the third synchronizer $S_{AC}$ is preselected or pre-engaged with the C gearing 136. Prior to the downshift to the third mode M3 or range $B_{Lo}$, the first synchronizer $S_{BLo}$ is pre-engaged with the $B_{Lo}$ gearing 132.

In the fifth mode M5 or range $C_{Lo}$, the first synchronizer $S_{BLo}$ is engaged with the A and C gearings 130, 136 and the third synchronizer $S_{AC}$ is engaged with the C gearing 136. From the fifth mode M5 or range $C_{Lo}$, the transmission 110 can be upshifted to the sixth mode M6 or range $C_{Hi}$ or downshifted to the fourth mode M4 or range $B_{Hi}$. Prior to the upshift to the sixth mode M6 or range $C_{Hi}$, the second synchronizer $S_{BHi}$ is pre-engaged with the A and C gearings 130, 136. When the upshift to sixth mode M6 or range $C_{Hi}$ is complete, the first synchronizer $S_{BLo}$ can be disengaged or remain engaged in anticipation of a downshift to the fifth mode M5 or range $C_{Lo}$. Prior to the downshift to the fourth mode M4 or range $B_{Hi}$, the second synchronizer $S_{BHi}$ is pre-engaged with the $B_{Hi}$ gearing 134.

In the sixth mode M6 or range $C_{Hi}$, the second synchronizer $S_{BHi}$ is engaged with the A and C gearings 130, 136 and the third synchronizer $S_{AC}$ is engaged with the C gearing 136. From the sixth mode M6 or range $C_{Hi}$, the transmission 110 can be downshifted to the fifth mode M5 or range $C_{Lo}$. Prior to the downshift to the fifth mode M5 or range $C_{Lo}$, the first synchronizer $S_{BLo}$ is pre-engaged with the A and C gearings 130, 136.

In addition to the adjacent mode or range shifts, from M1 to M2 or M4 to M3 for example, any mode or range shift from any of the low range modes, M1, M3, and M5, to any of the high range modes, M2, M4, and M6, or vice versa, may also include this synchronizer pre-selection functionality before disengaging and engaging the low and high range clutches.

Figure 5:
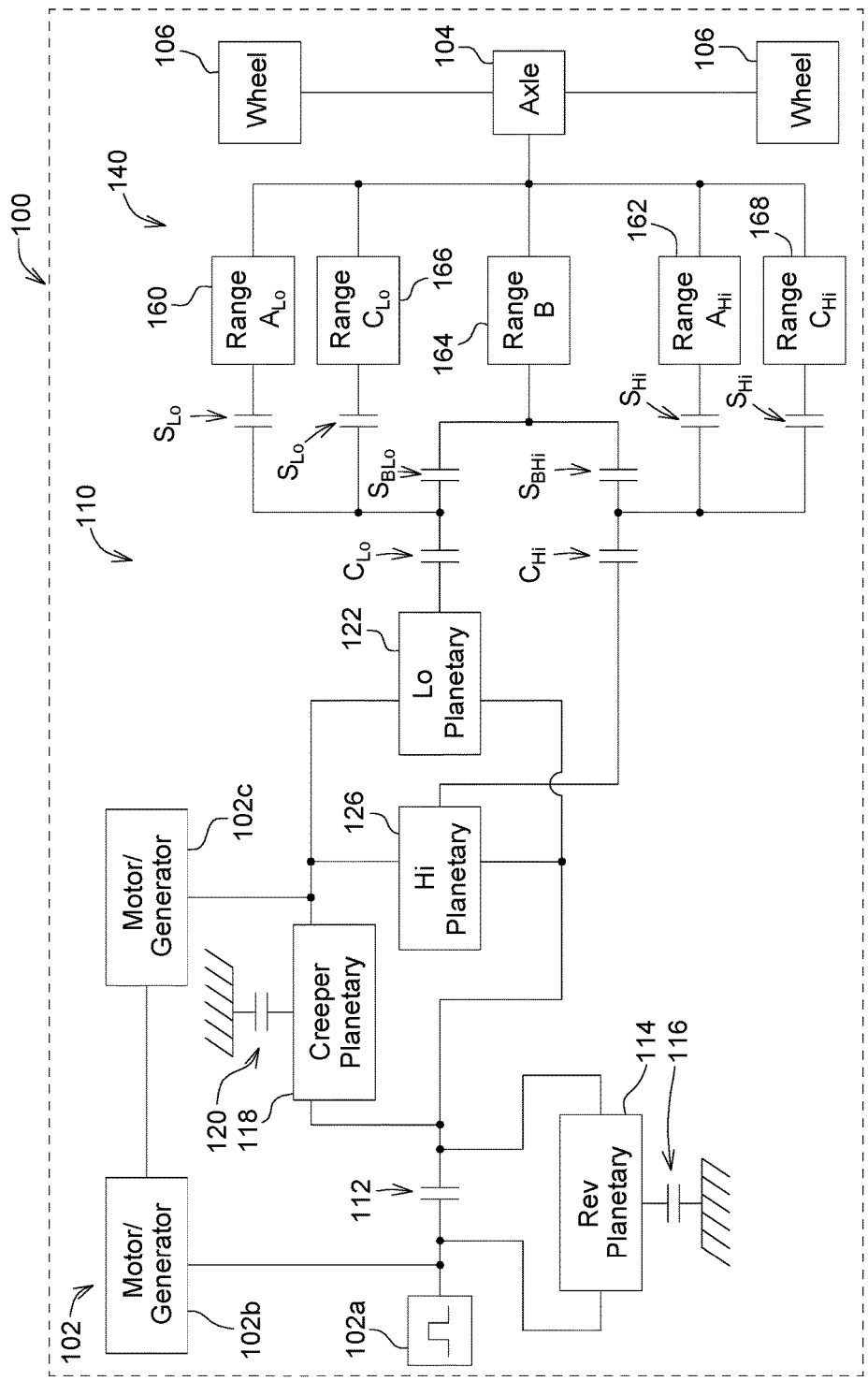
FIG. 5 is a schematic diagram of a powertrain for a vehicle, according to a second embodiment.
Figure 6:
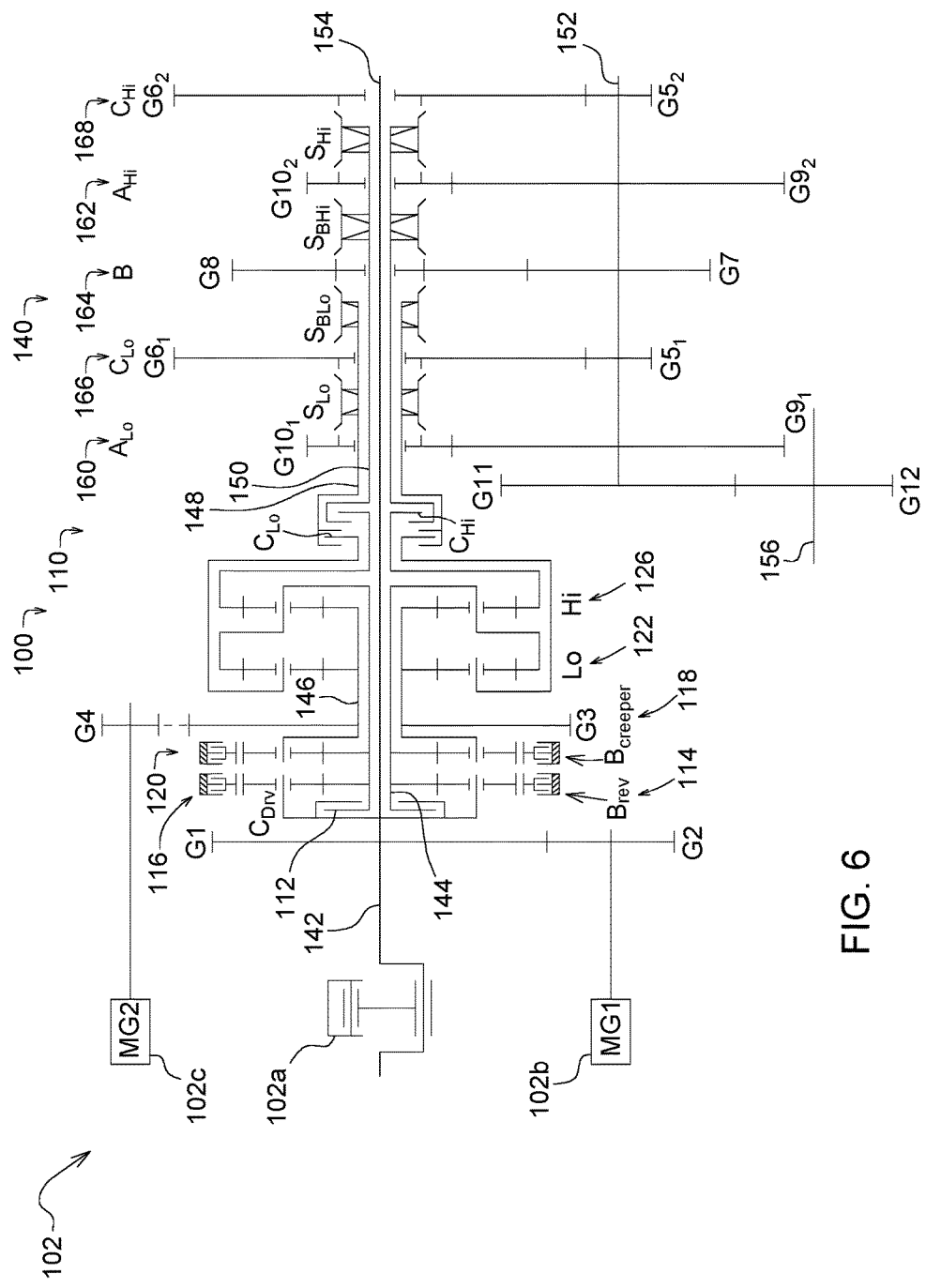
FIG. 6 is a schematic diagram of a powertrain for a vehicle, according to the second embodiment.

FIGS. 5 and 6 illustrate another embodiment of a powertrain 100 for a motorized vehicle. The preceding description of the powertrain 100 depicted in FIGS. 1 and 2 also applies to the powertrain 100 depicted in FIGS. 5 and 6, except for the following variations or modifications.

The transmission 110 may include an $A_{Lo}$ gear arrangement or gearing 160 having a first range gear $G10_1$ engaging or meshing with a second range gear $G9_1$. The first range gear $G10_1$ may be rotatably connected to or mounted about the first range shaft 148. The second range gear $G9_1$ may be fixedly connected to or mounted about the output shaft 152.

The transmission 110 may include an $A_{Hi}$ gear arrangement or gearing 162 having a third range gear $G10_2$ engaging or meshing with a second range gear $G9_2$. The third range gear $G10_2$ may be rotatably connected to or mounted about the second range shaft 150. The second range gear $G9_2$ may be fixedly connected to or mounted about the output shaft 152.

The transmission 110 may include a B gearing 164 having a fifth range gear G8 engaging or meshing with a sixth range gear G7. The fifth range gear G8 may be rotatably connected to or mounted about the first range shaft 148 or the second range shaft 150. The fifth range gear G8 may be releasably coupled or fixed to either the first range shaft 148 or the second range shaft 150. The sixth range gear G7 may be fixedly connected to or mounted about the output shaft 152.

The transmission 110 may include a $C_{Lo}$ gearing 166 having a seventh range gear $G6_1$ engaging or meshing with an eighth range gear $G5_1$. The seventh range gear $G6_1$ may be rotatably connected to or mounted about the first range shaft 148. The eighth range gear $G5_1$ may be fixedly connected to or mounted about the output shaft 152.

The transmission 110 may include a $C_{Hi}$ gearing 168 having a ninth range gear $G6_2$ engaging or meshing with an tenth range gear $G5_2$. The ninth range gear $G6_2$ may be rotatably connected to or mounted about the second range shaft 150. The tenth range gear $G5_2$ may be fixedly connected to or mounted about the output shaft 152.

The transmission 110 may include a first synchronizer $S_{Lo}$, which selectively engages the $A_{Lo}$ gearing 160 or the $C_{Lo}$ gearing 166. The first synchronizer $S_{Lo}$ may be connected to or mounted about the first range shaft 148. The first synchronizer $S_{Lo}$ may have three positions or conditions: a disengaged position, a first engaged position with the $A_{Lo}$ gearing 160, or a second engaged position with the $C_{Lo}$ gearing 166.

The transmission 110 may include a second synchronizer $S_{Hi}$, which selectively engages the $A_{Hi}$ gearing 162 or the $C_{Hi}$ gearing 168. The second synchronizer $S_{Hi}$ may be fixedly connected to or mounted about the second range shaft 150. The second synchronizer $S_{Hi}$ may have three positions or conditions: a disengaged position, a first engaged position with the $A_{Hi}$ gearing 162, or a second engaged position with the $C_{Hi}$ gearing 168.

The transmission 110 may include a third synchronizer $S_{BLo}$, which selectively engages the B gearing 164. The third synchronizer $S_{BLo}$ may be connected to or mounted about the first range shaft 148. The first synchronizer $S_{BLo}$ may have two positions or conditions: a disengaged position and an engaged position with the B gearing 164.

The transmission 110 may include a fourth synchronizer $S_{BHi}$, which selectively engages the B gearing 164. The fourth synchronizer $S_{BHi}$ may be fixedly connected to or mounted about the second range shaft 150. The second synchronizer $S_{BHi}$ may have two positions or conditions: a disengaged position and an engaged position with the B gearing 164.

The first synchronizer $S_{Lo}$ may selectively engage the $A_{Lo}$ gearing 160 by releasably coupling or fixing the first range gear $G10_1$ to the first range shaft 148 causing the first range gear $G10_1$ to rotate with the first range shaft 148, which causes the second range gear $G9_1$ to rotate. This causes the output shaft 152 to rotate at a speed relative to the first range shaft 148 based upon the ratio of first range gear $G10_1$ to the second range gear $G9_1$.

The first synchronizer $S_{Lo}$ may selectively engage the $C_{Lo}$ gearing 166 by releasably coupling or fixing the seventh range gear $G6_1$ to the first range shaft 148 causing the seventh range gear $G6_1$ to rotate with the first range shaft 148, which causes the eighth range gear $G5_1$ to rotate. This causes the output shaft 152 to rotate at a speed relative to the first range shaft 148 based upon the ratio of seventh range gear $G6_1$ to the eighth range gear $G5_1$.

The second synchronizer may selectively engage the $A_{Hi}$ gearing 162 by releasably coupling or fixing the third range gear $G10_2$ to the second range shaft 150 causing the third range gear $G10_2$ to rotate with the second range shaft 150, which causes the fourth range gear $G9_2$ to rotate. This causes the output shaft 152 to rotate at a speed relative to the second range shaft 150 based upon the ratio of third range gear $G10_2$ to the fourth range gear $G9_2$.

The second synchronizer $S_{Hi}$ may selectively engage the $C_{Hi}$ gearing 168 by releasably coupling or fixing the ninth range gear $G6_2$ to the second range shaft 150 causing the ninth range gear $G6_2$ to rotate with the second range shaft 150, which causes the tenth range gear $G5_2$ to rotate. This causes the output shaft 152 to rotate at a speed relative to the second range shaft 150 based upon the ratio of ninth range gear $G6_2$ to tenth range gear $G5_2$.

The third synchronizer $S_{BLo}$ may selectively engage the B gearing 164 by releasably coupling or fixing the fifth range gear G8 to the first range shaft 148 causing the fifth range gear G8 to rotate with the first range shaft 148, which causes the sixth range gear G7 to rotate. This causes the output shaft 152 to rotate at a speed relative to the first range shaft 148 based upon the ratio of fifth range gear G8 to the sixth range gear G7.

The fourth synchronizer $S_{BHi}$ may selectively engage the B gearing 164 by releasably coupling or fixing the fifth range gear G8 to the second range shaft 150 causing the fifth range gear G8 to rotate with the second range shaft 150, which causes the sixth range gear G7 to rotate. This causes the output shaft 152 to rotate at a speed relative to the second range shaft 150 based upon the ratio of fifth range gear G8 to the sixth range gear G7.

In this embodiment, the range selection apparatus 140 may include the low and high range clutches Lo, Hi; the first, second, third, and fourth synchronizers $S_{Lo}$, $S_{Hi}$, $S_{BLo}$, $S_{BHi}$; the first and second range shafts 148, 150; the output shaft 152; and the $A_{Lo}$, $A_{Hi}$, B, $C_{Lo}$, and $C_{Hi}$ gearings 160, 162, 164, 166, 168.

FIG. 7A illustrates the modes or ranges of the transmission 110 during upshifts, and FIG. 7B illustrates the modes or ranges of the transmission 110 during downshift, which illustrates the power flow from the low and high range clutches $C_{Lo}$, $C_{Hi}$ to the output shaft 152, according to some embodiments. As depicted in FIGS. 7A and 7B, the synchronizers which are preselected or pre-engaged are indicated in italics with an asterisk.

Figure 8:
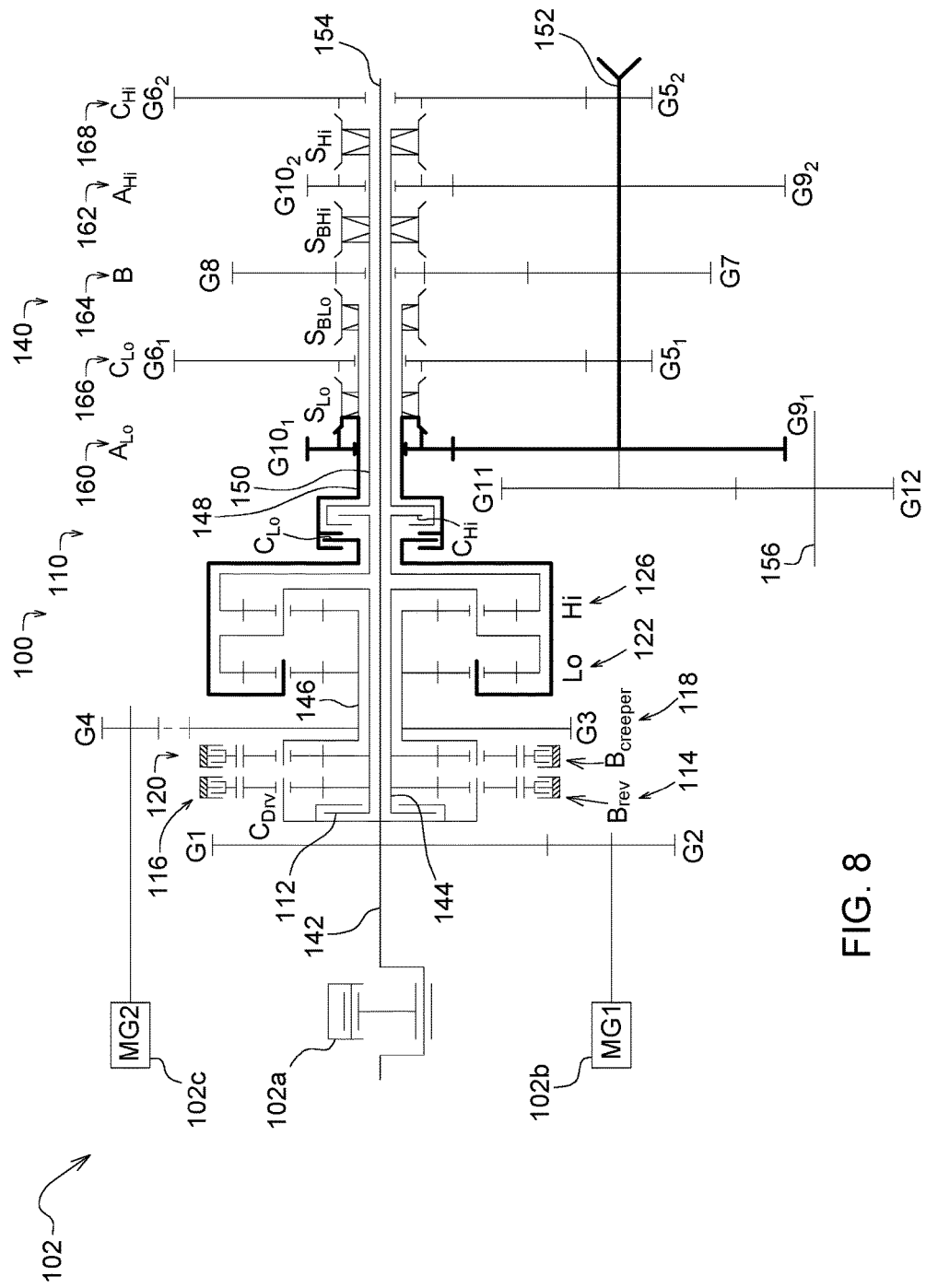
FIG. 8 is a schematic diagram of a powertrain for a vehicle, according to the second embodiment.

For example, in a first mode M1 or first range $A_{Lo}$, the low range clutch $C_{Lo}$ is engaged, the first synchronizer $S_{Lo}$ is engaged with the first range gear $G10_1$ of the A gearing 160. The second synchronizer $S_{Hi}$ may be preselected or pre-engaged with the third range gear $G10_2$ of the $A_{Hi}$ gearing 162. The power flows from the low range gearing or planetary (Lo) 122 to the output shaft 152, as shown in FIG. 8. The power flows from the low range gearing (Lo) 122 to the low range shaft 148 via the engaged low range clutch $C_{Lo}$. The power then flows from the low range shaft 148 to the first range gear $G10_1$ via the engaged first synchronizer $S_{Lo}$. The power then flows from the first range gear $G10_1$ to the engaged or meshed second range gear $G9_1$. The power then flows from the second range gear $G9_1$ to the output shaft 152. Even when the second synchronizer $S_{Hi}$ is pre-engaged with the third range gear $G10_2$ of the $A_{Hi}$ gearing 162, no power flows through this path in the first mode M1 or first range $A_{Lo}$ because the high range clutch $C_{Hi}$ is disengaged.

Prior to an upshift from the first mode M1 or range $A_{Lo}$ to a second mode M2 or range $A_{Hi}$, the second synchronizer $S_{Hi}$ is pre-engaged with the third range gear $G10_2$ of the $A_{Hi}$ gearing 162. Then during the upshift, the low range clutch $C_{Lo}$ is disengaged and the high range clutch $C_{Hi}$ is engaged. The synchronizers do not need to be engaged or disengaged at the same time the low and high range clutches $C_{Lo}$, $C_{Hi}$ are being disengaged and engaged because the second synchronizer $S_{Hi}$ was pre-engaged with the $A_{Hi}$ gearing 162 before the upshift started. Alternatively, the second synchronizer $S_{Hi}$ can be pre-engaged at the beginning of the upshift. When the upshift is complete, the first synchronizer $S_{Lo}$ can be disengaged from the $A_{Lo}$ gearing 160.

In the second mode M2 or second range $A_{Hi}$, the second synchronizer $S_{Hi}$ is engaged with the $A_{Hi}$ gearing 162. From the second mode M2 or second range $A_{Hi}$, the transmission 110 can be upshifted to a third mode M3 or third range $B_{Lo}$ or downshifted to the first mode M1 or first range $A_{Lo}$. Prior to the upshift to the third mode M3 or third range $B_{Lo}$ from the second mode M2 or second range $A_{Hi}$, the first synchronizer $S_{Lo}$ is pre-engaged with the gear G8 of the B gearing 164. Then during the upshift, the high range clutch $C_{Hi}$ is disengaged and the low range clutch $C_{Lo}$ is engaged. As stated above, the synchronizers do not need to be engaged or disengaged at the same time the low and high range clutches $C_{Lo}$, $C_{Hi}$ are being engaged and disengaged because the first synchronizer $S_{Lo}$ was pre-engaged before the upshift started. When the upshift is complete, the second synchronizer $S_{Hi}$ can be disengaged or it can remain engaged.

Prior to the downshift to the first mode M1 or first range $A_{Lo}$ from the second mode M2 or second range $A_{Hi}$, the first synchronizer $S_{Lo}$ is pre-engaged with the first range gear $G10_1$ of the $A_{Lo}$ gearing 160. Then during the downshift, the high range clutch $C_{Hi}$ is disengaged and the low range clutch $C_{Lo}$ is engaged. Again, the synchronizers do not need to be engaged or disengaged at the same time the low and high range clutches $C_{Lo}$, $C_{Hi}$ are being engaged and disengaged because the first synchronizer $S_{Lo}$ was pre-engaged before the downshift started. When the downshift is complete, the second synchronizer $S_{Hi}$ can be disengaged or remain engaged in anticipation of an upshift to the second mode M2 or second range $A_{Hi}$.

In the third mode M3 or range $B_{Lo}$, the third synchronizer $S_{BLo}$ is engaged with the B gearing 164. From the third mode M3 or range $B_{Lo}$, the transmission 110 can be upshifted to the fourth mode M4 or range $B_{Hi}$ or downshifted to the second mode M2 or range $A_{Hi}$. Prior to the upshift to the fourth mode M4 or range $B_{Hi}$ the fourth synchronizer $S_{BHi}$ is pre-engaged with the B gearing 164. Prior to the downshift to the second mode M2 or range $A_{Hi}$, the second synchronizer $S_{Hi}$ is pre-engaged with the $A_{Hi}$ gearing 162.

In the fourth mode M4 or range $B_{Hi}$, the fourth synchronizer $S_{BHi}$ is engaged with the B gearing 164. From the fourth mode M4 or range $B_{Hi}$, the transmission 110 can be upshifted to the fifth mode M5 or range $C_{Lo}$ or downshifted to the third mode M3 or range $B_{Lo}$. Prior to the upshift to the fifth mode M5 or range $C_{Lo}$, the first synchronizer $S_{Lo}$ is pre-engaged with the $C_{Lo}$ gearing 166. Prior to the downshift to the third mode M3 or range $B_{Lo}$, the third synchronizer $S_{BLo}$ is pre-engaged with the B gearing 164.

In the fifth mode M5 or range $C_{Lo}$, the first synchronizer $S_{Lo}$ is engaged with the $C_{Lo}$ gearing 166. From the fifth mode M5 or range $C_{Lo}$, the transmission 110 can be upshifted to the sixth mode M6 or range $C_{Hi}$ or downshifted to the fourth mode M4 or range $B_{Hi}$. Prior to the upshift to the sixth mode M6 or range $C_{Hi}$, the second synchronizer $S_{Hi}$ is pre-engaged with the $C_{Hi}$ gearing 168. When the upshift to the sixth mode M6 or range $C_{Hi}$ is complete, the first synchronizer $S_{Lo}$ can be disengaged or remain engaged in anticipation of a downshift to the fifth mode M5 or range $C_{Lo}$. Prior to the downshift to the fourth mode M4 or range $B_{Hi}$, the fourth synchronizer $S_{BHi}$ is pre-engaged with the B gearing 164.

In the sixth mode M6 or range $C_{Hi}$, the second synchronizer $S_{Hi}$ is engaged with the $C_{Hi}$ gearing 168. From the sixth mode M6 or range $C_{Hi}$, the transmission 110 can be downshifted to the fifth mode M5 or range $C_{Lo}$. Prior to the downshift to the fifth mode M5 or range $C_{Lo}$, the first synchronizer $S_{Lo}$ is pre-engaged with the $C_{Lo}$ gearing 166.

Figure 9:
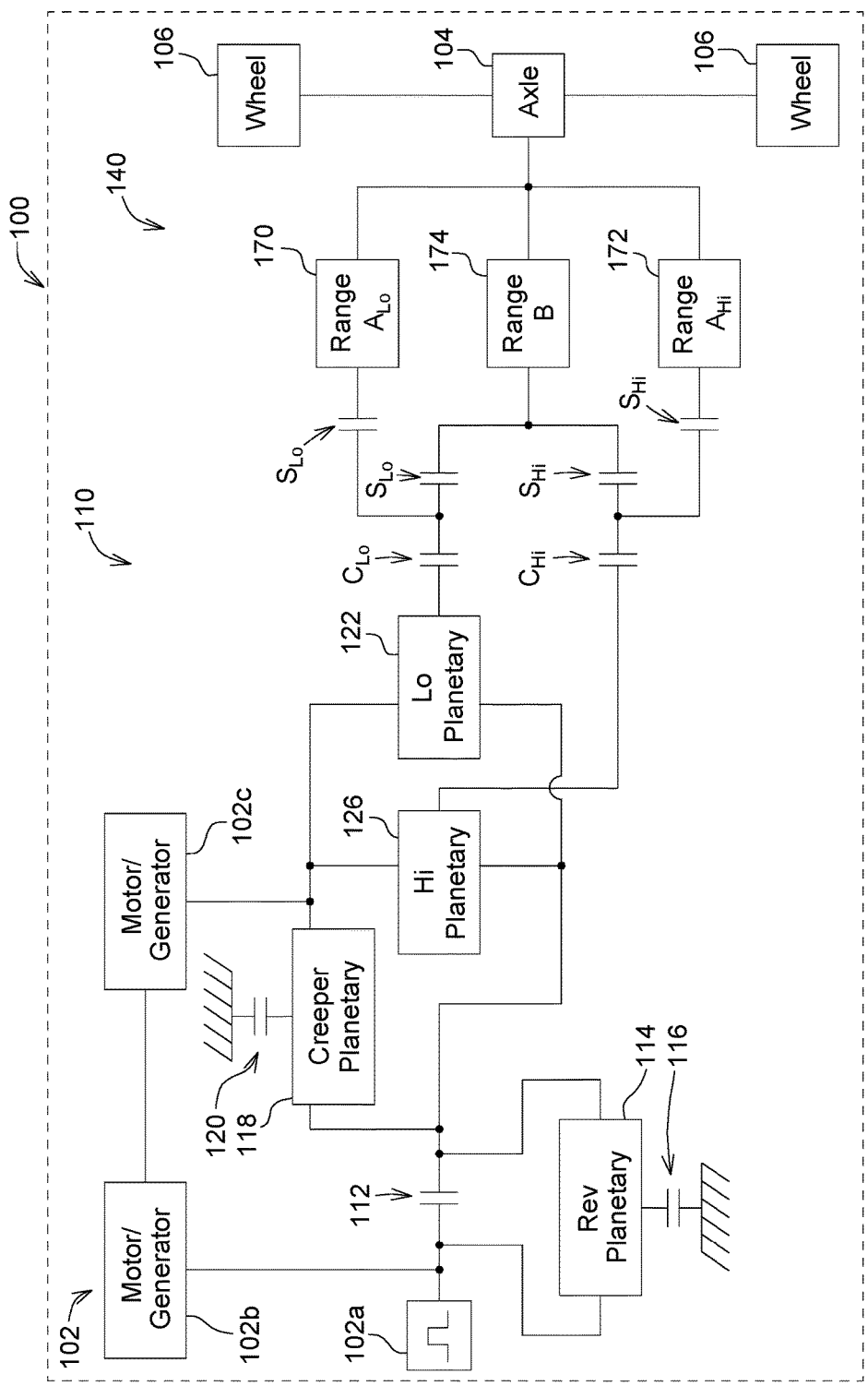
FIG. 9 is a schematic diagram of a powertrain for a vehicle, according to a third embodiment.
Figure 10:
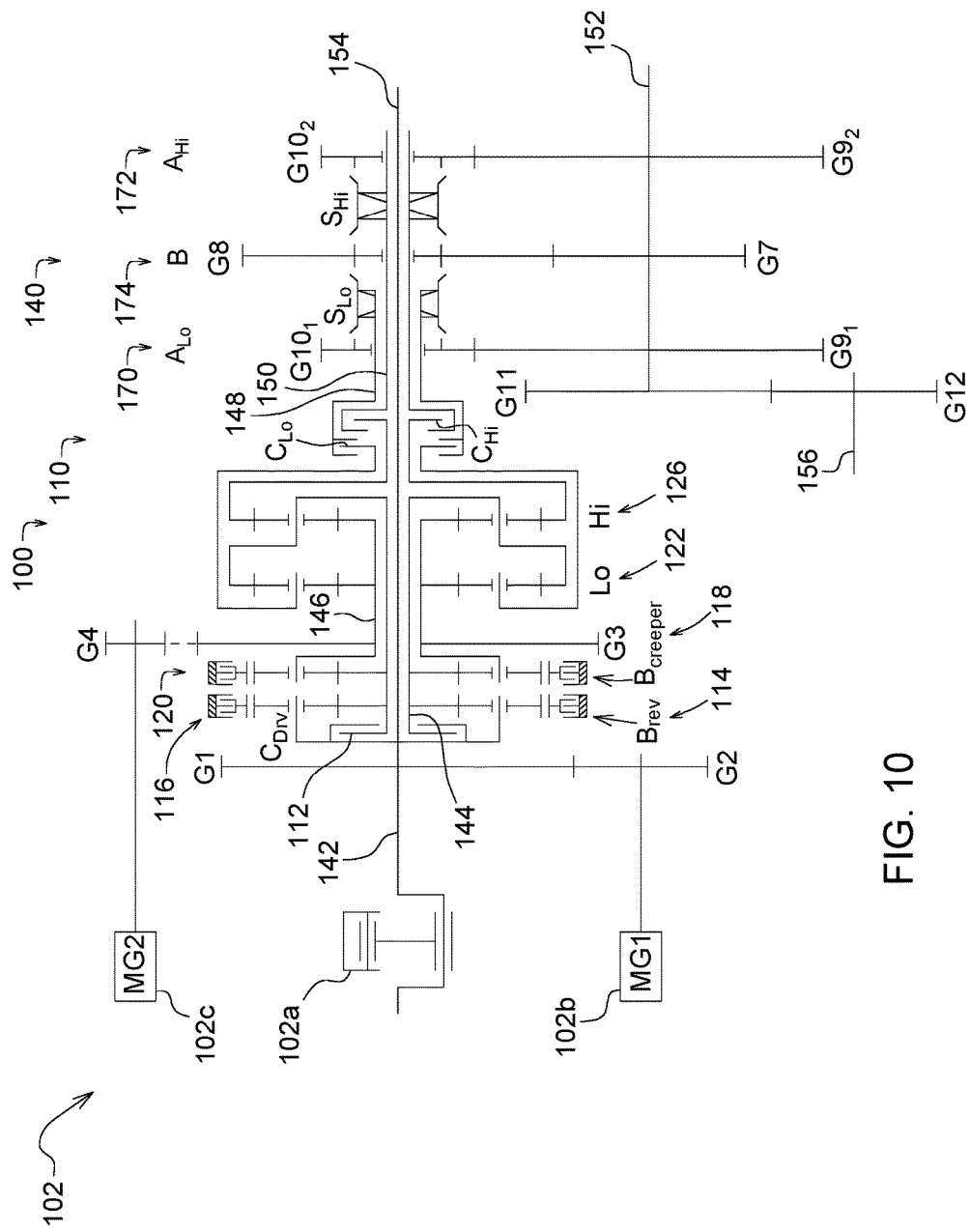
FIG. 10 is a schematic diagram of a powertrain for a vehicle, according to the third embodiment.

FIGS. 9 and 10 illustrate another embodiment of a powertrain 100 for a motorized vehicle. The preceding description of the powertrain 100 depicted in FIGS. 1 and 2 also applies to the powertrain 100 depicted in FIGS. 9 and 10, except for the following variations or modifications.

The transmission 110 may include an $A_{Lo}$ gearing 170 having a first range gear $G10_1$ engaging or meshing with a second range gear $G9_1$. The first range gear $G10_1$ may be rotatably connected to or mounted about the first range shaft 148. The second range gear $G9_1$ may be fixedly connected to or mounted about the output shaft 152.

The transmission 110 may include a $A_{Hi}$ gearing 172 having a third range gear $G10_2$ engaging or meshing with a second range gear $G9_2$. The third range gear $G10_2$ may be rotatably connected to or mounted about the second range shaft 150. The second range gear $G9_2$ may be fixedly connected to or mounted about the output shaft 152.

The transmission 110 may include a B gearing 174 having a fifth range gear G8 engaging or meshing with a sixth range gear G7. The fifth range gear G8 may be rotatably connected to or mounted about the first range shaft 148 or the second range shaft 150. The fifth range gear G8 may be releasably coupled to either the first range shaft 148 or the second range shaft 150. The sixth range gear G7 may be fixedly connected to or mounted about the output shaft 152.

The transmission 110 may include a first synchronizer $S_{Lo}$, which selectively engages the $A_{Lo}$ gearing 170 or the B gearing 174. The first synchronizer $S_{Lo}$ may be connected to or mounted about the first range shaft 148. The first synchronizer $S_{Lo}$ may have three positions or conditions: a disengaged position, a first engaged position with the $A_{Lo}$ gearing 170, or a second engaged position with the B gearing 174.

The transmission 110 may include a second synchronizer $S_{Hi}$, which selectively engages the $A_{Hi}$ gearing 172 or the B gearing 174. The second synchronizer $S_{Hi}$ may be fixedly connected to or mounted about the second range shaft 150. The second synchronizer $S_{Hi}$ may have three positions or conditions: a disengaged position, a first engaged position with the $A_{Hi}$ gearing 172, or a second engaged position with the B gearing 174.

The first synchronizer $S_{Lo}$ may selectively engage the $A_{Lo}$ gearing 170 by releasably coupling or fixing the first range gear $G10_1$ to the first range shaft 148 causing the first range gear $G10_1$ to rotate with the first range shaft 148, which causes the second range gear $G9_1$ to rotate. This causes the output shaft 152 to rotate at a speed relative to the first range shaft 148 based upon the ratio of first range gear $G10_1$ to the second range gear $G9_1$.

The first synchronizer $S_{Lo}$ may selectively engage the B gearing 174 by releasably coupling or fixing the fifth range gear G8 to the first range shaft 148 causing the fifth range gear G8 to rotate with the first range shaft 148, which causes the sixth range gear G7 to rotate. This causes the output shaft 152 to rotate at a speed relative to the first range shaft 148 based upon the ratio of fifth range gear G8 to the sixth range gear G7.

The second synchronizer $S_{Hi}$ may selectively engage the $A_{Hi}$ gearing 172 by releasably coupling or fixing the third range gear $G10_2$ to the second range shaft 150 causing the third range gear $G10_2$ to rotate with the second range shaft 150, which causes the fourth range gear $G9_2$ to rotate. This causes the output shaft 152 to rotate at a speed relative to the second range shaft 150 based upon the ratio of third range gear $G10_2$ to the fourth range gear $G9_2$.

The second synchronizer $S_{Hi}$ may selectively engage the B gearing 174 by releasably coupling or fixing the fifth range gear G8 to the second range shaft 150 causing the fifth range gear G8 to rotate with the first range shaft 148, which causes the sixth range gear G7 to rotate. This causes the output shaft 152 to rotate at a speed relative to the second range shaft 150 based upon the ratio of fifth range gear G8 to the sixth range gear G7.

In this embodiment, the range selection apparatus 140 may include the low and high range clutches Lo, Hi; the first and second synchronizers $S_{Lo}$, $S_{Hi}$; the first and second range shafts 148, 150; the output shaft 152; and the $A_{Lo}$, $A_{Hi}$; and B gearings 170, 172, 174.

FIG. 11A illustrates the modes or ranges of the transmission 110 during upshifts, and FIG. 11B illustrates the modes or ranges of the transmission 110 during downshift, which illustrates the power flow from the low and high range clutches $C_{Lo}$, $C_{Hi}$ to the output shaft 152, according to some embodiments. As depicted in FIGS. 11A and 11B, the synchronizers which are preselected or pre-engaged are indicated in italics with an asterisk.

Figure 12:
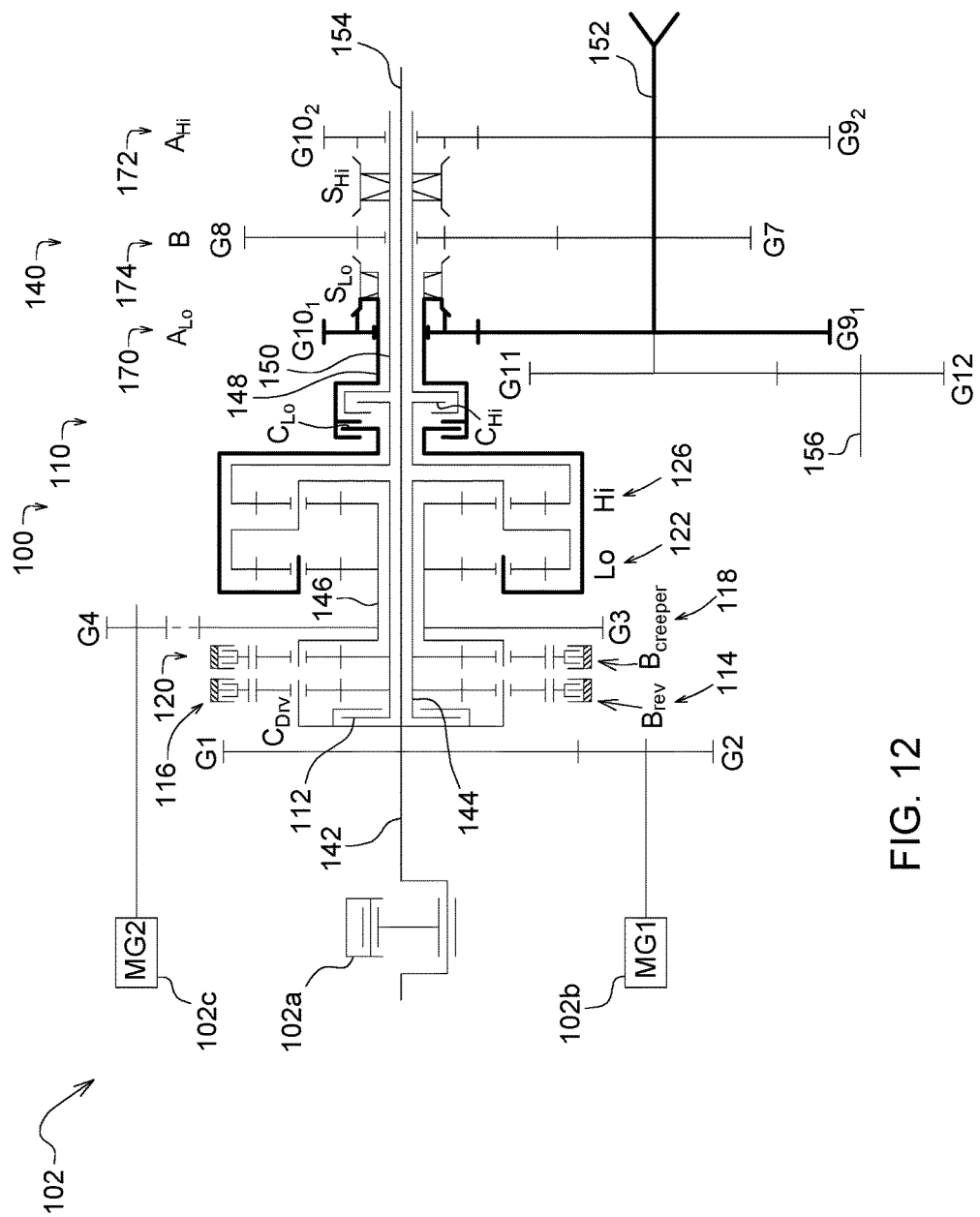
FIG. 12 is a schematic diagram of a powertrain for a vehicle, according to the third embodiment.

For example, in a first mode M1 or first range $A_{Lo}$, the low range clutch $C_{Lo}$ is engaged, the first synchronizer $S_{Lo}$ is engaged with the first range gear $G10_1$ of the A gearing 170. The second synchronizer $S_{Hi}$ may be preselected or pre-engaged with the third range gear $G10_2$ of the $A_{Hi}$ gearing 172. The power flows from the low range gearing or planetary (Lo) 122 to the output shaft 152, as shown in FIG. 12. The power flows from the low range gearing (Lo) 122 to the low range shaft 148 via the engaged low range clutch $C_{Lo}$. The power then flows from the low range shaft 148 to the first range gear $G10_1$ via the engaged first synchronizer $S_{Lo}$. The power then flows from the first range gear $G10_1$ to the engaged or meshed second range gear $G9_1$. The power then flows from the second range gear $G9_1$ to the output shaft 152. Even when the second synchronizer $S_{Hi}$ is pre-engaged with the third range gear $G10_2$ of the $A_{Hi}$ gearing 172, no power flows through this path in the first mode M1 or first range $A_{Lo}$ because the high range clutch $C_{Hi}$ is disengaged.

Prior to an upshift from the first mode M1 or range $A_{Lo}$ to a second mode M2 or range $A_{Hi}$, the second synchronizer $S_{Hi}$ is pre-engaged with the third range gear $G10_2$ of the $A_{Hi}$ gearing 172. Then during the upshift, the low range clutch $C_{Lo}$ is disengaged and the high range clutch $C_{Hi}$ is engaged. The synchronizers do not need to be engaged or disengaged at the same time the low and high range clutches $C_{Lo}$, $C_{Hi}$ are being disengaged and engaged because the second synchronizer $S_{Hi}$ was pre-engaged with the $A_{Hi}$ gearing 172 before the upshift started. Alternatively, the second synchronizer $S_{Hi}$ can be pre-engaged at the beginning of the upshift. When the upshift is complete, the first synchronizer $S_{Lo}$ can be disengaged from the $A_{Lo}$ gearing 170 or it can remain engaged.

In the second mode M2 or second range $A_{Hi}$, the second synchronizer $S_{Hi}$ is engaged with the $A_{Hi}$ gearing 172. From the second mode M2 or second range $A_{Hi}$, the transmission 110 can be upshifted to a third mode M3 or third range $B_{Lo}$ or downshifted to the first mode M1 or first range $A_{Lo}$. Prior to the upshift to the third mode M3 or third range $B_{Lo}$, the first synchronizer $S_{Lo}$ is pre-engaged with the gear G8 of the B gearing 174. Then during the upshift, the high range clutch $C_{Hi}$ is disengaged and the low range clutch $C_{Lo}$ is engaged. When the upshift is complete, the second synchronizer $S_{Hi}$ can be disengaged. Prior to the downshift to the first mode M1 or first range $A_{Lo}$, the first synchronizer $S_{Lo}$ is pre-engaged with the first range gear $G10_1$ of the $A_{Lo}$ gearing 170. Then during the downshift, the high range clutch $C_{Hi}$ is disengaged and the low range clutch $C_{Lo}$ is engaged. When the downshift is complete, the second synchronizer $S_{Hi}$ can be disengaged or remain engaged in anticipation of an upshift to the second mode M2 or second range $A_{Hi}$.

In the third mode M3 or range $B_{Lo}$, the first synchronizer $S_{Lo}$ is engaged with the B gearing 174. From the third mode M3 or range $B_{Lo}$, the transmission 110 can be upshifted to the fourth mode M4 or range $B_{Hi}$ or downshifted to the second mode M2 or range $A_{Hi}$. Prior to the upshift to the fourth mode M4 or range $B_{Hi}$, the second synchronizer $S_{Hi}$ is pre-engaged with the B gearing 174. When the upshift to the fourth mode M4 or range $B_{Hi}$ is complete, the first synchronizer $S_{Lo}$ can be disengaged or remain engaged in anticipation of a downshift to the third mode M3 or range $B_{Lo}$. Prior to the downshift to the second mode M2 or range $A_{Hi}$, the second synchronizer $S_{Hi}$ is pre-engaged with the $A_{Hi}$ gearing 172.

In the fourth mode M4 or range $B_{Hi}$, the fourth synchronizer $S_{BHi}$ is engaged with the B gearing 174. From the fourth mode M4 or range $B_{Hi}$, the transmission 110 can be downshifted to the third mode M3 or range $B_{Lo}$. Prior to the downshift to the third mode M3 or range $B_{Lo}$, the third synchronizer $S_{BLo}$ is pre-engaged with the B gearing 174.

Figure 13:
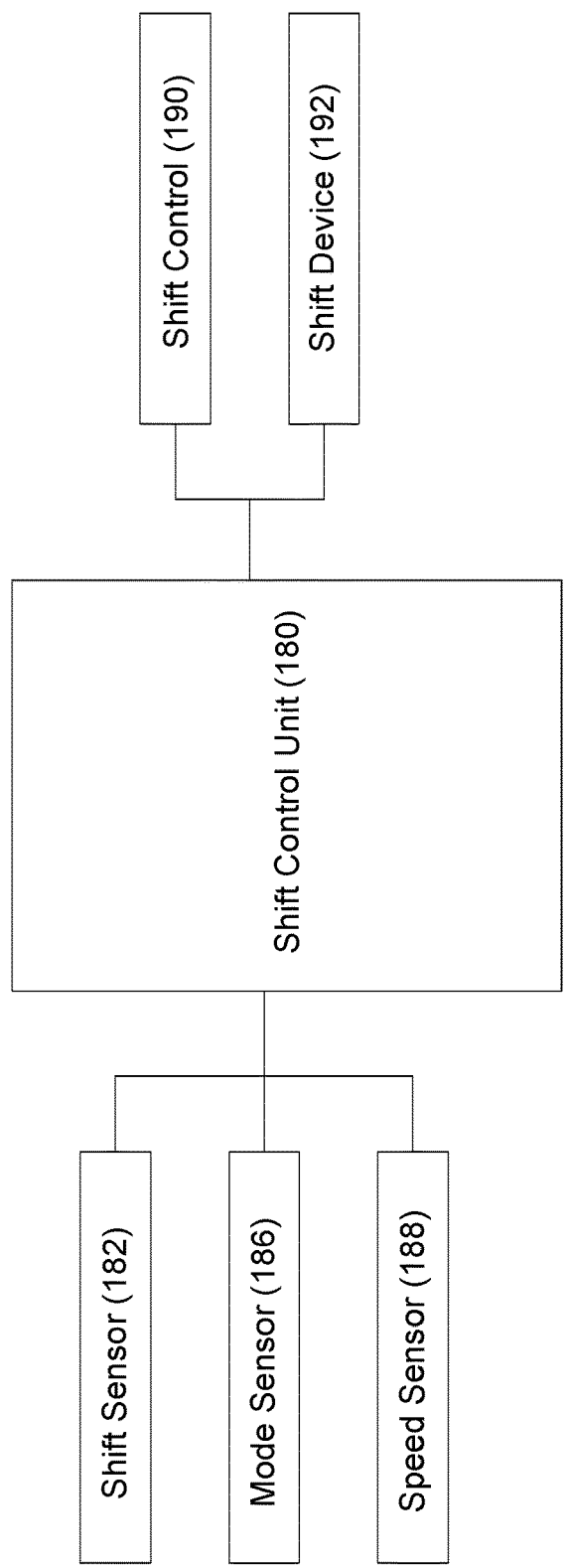
FIG. 13 is a schematic diagram of a shift control unit, according to one embodiment.
Figure 14:
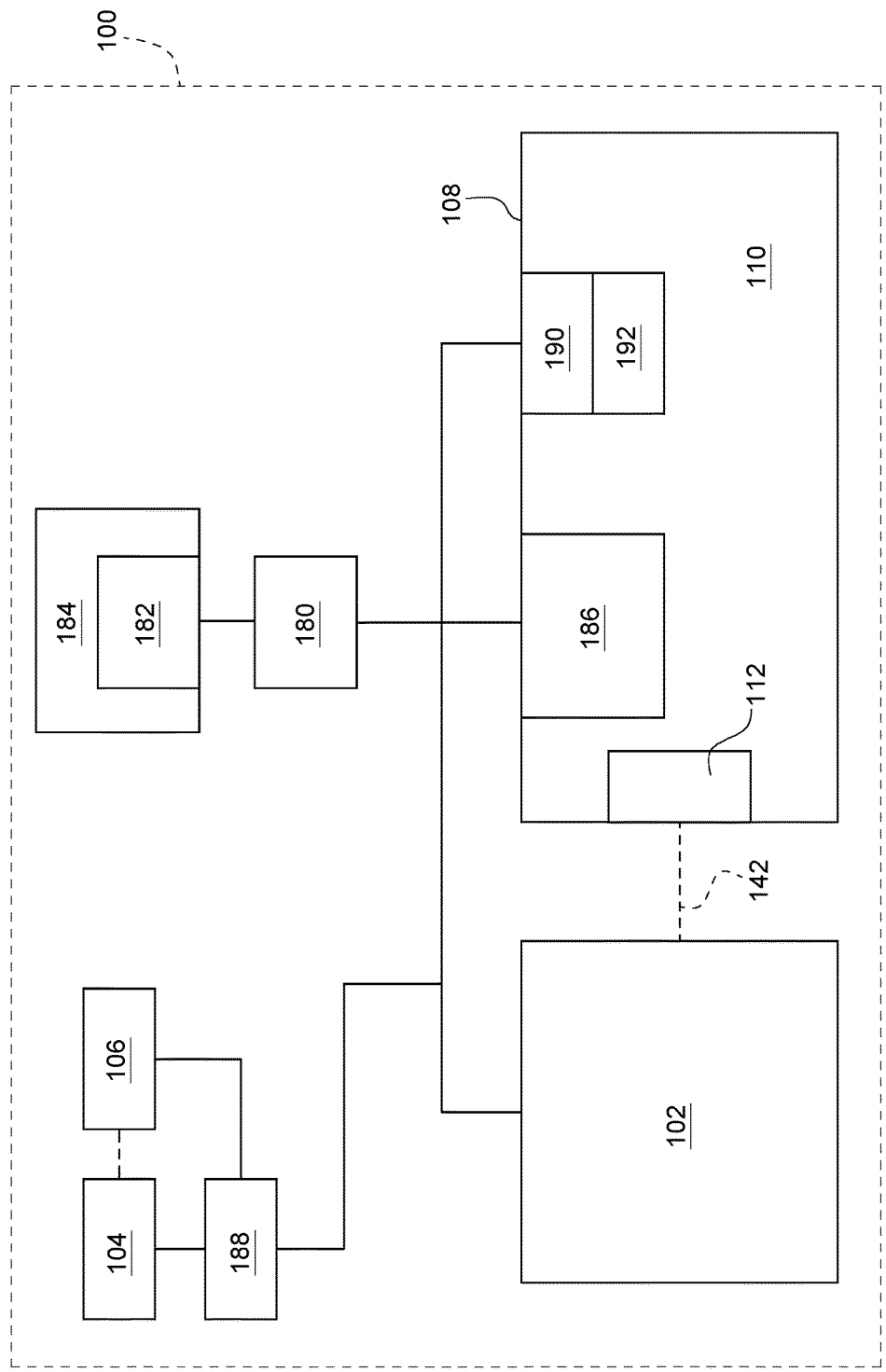
FIG. 14 is a schematic diagram for an implementation of a shift control unit in a powertrain of a vehicle, according to one embodiment.

FIG. 13 illustrates a schematic diagram of a shift control unit, or shift controller, 180, according to one embodiment. FIG. 14 illustrates a schematic diagram of an implementation of a shift controller 180 in a powertrain 100 of a vehicle, according to one embodiment. The following description may refer to the embodiment in FIG. 13, the embodiment in FIG. 14, or both. The powertrain 100 may include a power source 102, such as an internal combustion engine, an electric motor-generator, a hydraulic motor-generator, a pneumatic motor-generator, or any combination of power sources. The powertrain 100 may include a transmission 110 having a housing 108, a drive clutch ($C_{Drv}$) 112, and an input shaft 142 operably connected to the power source 102. A shift input device 184 may be operably connected to the transmission 110 and provide shift commands or instructions to the transmission 110.

The shift control unit, or shift controller, 180 may include one or more microprocessor-based electronic control units or controllers, which perform calculations, comparisons, and execute instructions. The shift controller 180 can be a programmable logic controller, also known as a PLC or programmable controller. The shift controller 180 may connect to a vehicle or tractor electronic control system through a data bus, such as a CAN bus, or the shift controller 180 could be a part of the vehicle or tractor electronic control system. The shift controller 180 may be in communication with one or more sensors including, but not limited to: a shift sensor 182, a mode or range sensor 186, and a speed sensor 188. The shift controller 180 may be in communication with one or more actuators or actuator controls including, but not limited to, a shift control 190 and a shift device 192.

The shift sensor 182 may be positioned on or near any shift indication apparatus and detect an intention to change the mode or range. The shift sensor 182 may be positioned on or near the shift lever 184 and detect when an input is applied to the shift lever 184. The shift sensor 182 may detect the position and any movement of the shift lever 184.

The mode or range sensor 186 may be positioned on or in the transmission 110 and detect which range the transmission 110 is in including which clutches and synchronizer are engaged, disengaged, or pre-engaged. The mode sensor 186 may detect the current range by comparing the speeds of the relative transmission shafts. The mode sensor 186 may include one or more speed or rotation sensors to measure the speeds of the transmission shafts. The mode sensor 186 may include one or more sensors to determine the engagement position of the clutches and synchronizers.

The speed sensor 188 may be positioned near an output of the transmission 110 or an axle 104 or wheel 106 to detect whether the vehicle is moving and the speed and direction (i.e., forward or reverse). The speed sensor 188 may detect the speed and direction of an output of the transmission 110 or an axle 104 or wheel 106 and then determine or calculate the speed and direction of the vehicle.

The shift controller 180 may be in electrical communication with one or more of the sensors and may use the electrical communication or signals received from one or more of the sensors to determine whether to engage or disengage the clutches and synchronizers within the transmission 110. The shift controller 180 may determine whether to preselect or pre-engage one or more synchronizers based upon the input received from one or more sensors. For example, the shift controller 180 may pre-engage a synchronizer for the new mode or range when the intent to either upshift or downshift or determined. The shift controller 180 may then disengage and engage range clutches after the one or more synchronizers are engaged. When the shift is complete, the shift controller 180 may then disengage one or more synchronizers from the previous mode or range.

The transmission 110 may include a shift mechanism 192 and a shift control 190. The shift mechanism 192 may utilize any mechanical, hydraulic, pneumatic, or electrical components to shift gears or ranges within the transmission 110 including, but not limited to, a mechanical actuator, a pneumatic actuator or cylinder, a hydraulic actuator or cylinder, an electro-mechanical actuator, or a linear motor. The shift control 190, such as a switch or valve, may direct the shift mechanism 192 to shift modes or ranges within the transmission 110. The shift controller 180 may use communication received from one or more of the sensors to determine whether to shift modes or ranges within the transmission by engaging and disengaging the appropriate clutches and synchronizers, as described above. When the shift controller 180 determines to shift modes, the shift controller 180 sends communication to the shift mechanism 192, or to the shift control 190, directing the shift mechanism 192 change modes within the transmission. The shift mechanism 192 then changes modes based at least partially upon the communication from the shift controller 180, the shift control 190, or both.

Figure 15:
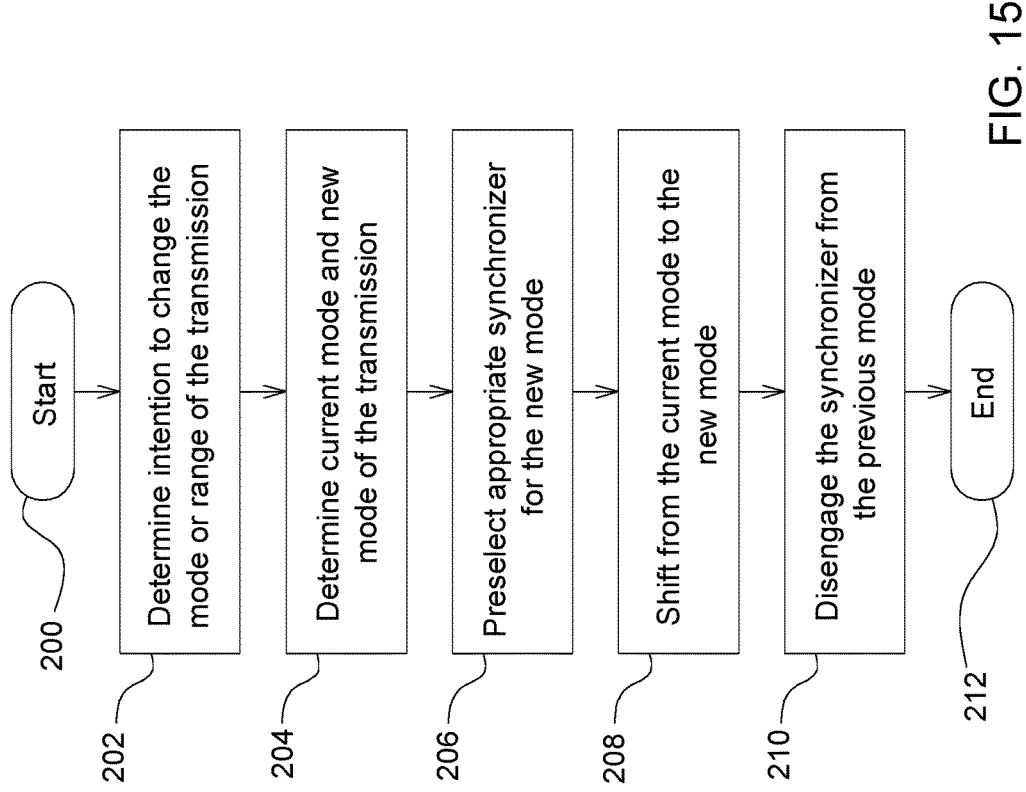
FIG. 15 is a flow chart for a method of shifting ranges in a powertrain of a vehicle, according to one embodiment.

FIG. 15 illustrates a flow chart for a method of shifting ranges in a powertrain of a vehicle, which may be implemented in one or more of the embodiments described herein and depicted in the various FIGURES. At step 200, the method starts.

At step 202, the intention to change the mode or range of the transmission 110 is determined. A shift controller 180 may perform this determination.

A step 204, the current mode or range and the new mode or range of the transmission 110 is determined. For example, the shift controller 180 can determine the current and new mode and whether an upshift or downshift is required.

At step 206, the appropriate synchronizer is preselected for the new mode. The shift controller 180 may determine and generate this selection.

At step 208, the transmission 110 is shifted from the current mode to the new mode by disengaging and engaging the appropriate range clutches. The transmission 110 is now in the new mode. The shift controller 180 may generate and control this mode or range shift.

At step 210, the one or more synchronizers from the previous mode are disengaged. The shift controller 180 may generate this disengagement.

At step 212, the shift from one mode or range to another has occurred, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is a preselection of one or more synchronizers prior to a change in modes or ranges of a transmission. Another technical effect of one or more of the example embodiments disclosed herein is the pre-engagement of the synchronizers before shifting the range clutches to reduce the demand on the shift control.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A transmission comprising:
   an input shaft, a first range shaft, a second range shaft, and an output shaft;

a low range gearing and a high range gearing operably connected to the input shaft;

a low range clutch having an engaged condition which operably connects the low range gearing to the first range shaft;

a high range clutch having an engaged condition which operably connects the high range gearing to the second range shaft;

a first range gear operably connected to one of the first range shaft and the second range shaft, the first range gear engaged with a second range gear operably connected to the output shaft;

a first synchronizer and a second synchronizer each having a first engaged condition;

a first mode which includes the low range clutch in the engaged condition and the first synchronizer in the first engaged condition causing the output shaft to rotate relative to the first range shaft based upon a ratio of the first range gear to the second range gear;

a second mode which includes the high range clutch in the engaged condition and the second synchronizer in the first engaged condition causing the output shaft to rotate relative to the second range shaft based upon a ratio of the first range gear to the second range gear;

a shift from the first mode to the second mode which includes engaging the second synchronizer in the first engaged condition before disengaging the low range clutch and engaging the high range clutch.

2. The transmission of claim 1, wherein the shift from the first mode to the second mode further includes disengaging the first synchronizer after engaging the high range clutch.

3. The transmission of claim 2 further comprising:
a third range gear operably connected to the first range shaft and engaged with a fourth range gear operably connected to the output shaft;

a third mode which includes the low range clutch in the engaged condition and the first synchronizer in a second engaged condition causing the output shaft to rotate relative to the first range shaft based upon a ratio of the third range gear to the fourth range gear;

a shift from the second mode to the third mode which includes engaging the first synchronizer in the second engaged condition before disengaging the high range clutch and engaging the low range clutch.

4. The transmission of claim 3 further comprising:
a fifth range gear operably connected to the first range shaft and engaged with a sixth range gear operably connected to the output shaft;

a fourth mode which includes the high range clutch in the engaged condition and the second synchronizer in a second engaged condition causing the output shaft to rotate relative to the second range shaft based upon a ratio of the fifth range gear to the sixth range gear;

a shift from the third mode to the fourth mode which includes engaging the second synchronizer in the second engaged condition before disengaging the low range clutch and engaging the high range clutch.

5. The transmission of claim 4, wherein the first and second modes further comprise a third synchronizer in a first engaged condition, and the third synchronizer remains in the first engaged condition during the shift from the first mode to the second mode.

6. The transmission of claim 5 further comprising:
a seventh range gear operably connected to the first range shaft and engaged with a eighth range gear operably connected to the output shaft;

a fifth mode which includes the low range clutch in the engaged condition, the first synchronizer in the first engaged condition, and the third synchronizer in a second engaged condition causing the output shaft to rotate relative to the first range shaft based upon a ratio of the seventh range gear to the eighth range gear;

a shift from the fourth mode to the fifth mode which includes engaging the first synchronizer in the first engaged condition and third synchronizer in the second engaged condition before disengaging the high range clutch and engaging the low range clutch.

7. The transmission of claim 6 further comprising:
a sixth mode which includes the high range clutch in the engaged condition, the second synchronizer in the first engaged condition, and a third synchronizer in the second engaged condition causing the output shaft to rotate relative to the second range shaft based upon a ratio of the seventh range gear to the eighth range gear;

a shift from the fifth mode to the sixth mode which includes engaging the second synchronizer in the first engaged condition before disengaging the low range clutch and engaging the high range clutch.

8. The transmission of claim 7, wherein the first synchronizer remains in the first engaged condition after engaging the high range clutch.

9. A transmission comprising:
an input shaft, a first range shaft, a second range shaft, and an output shaft;

a low range gearing and a high range gearing operably connected to the input shaft;

a low range clutch having an engaged condition which operably connects the low range gearing to the first range shaft;

a high range clutch having an engaged condition which operably connects the high range gearing to the second range shaft;

a first range gear operably connected to the first range shaft and engaged with a second range gear operably connected to the output shaft;

a third range gear operably connected to the first range shaft and engaged with a fourth range gear operably connected to the output shaft;

a first synchronizer and a second synchronizer each having a first engaged condition;

a first mode which includes the low range clutch in the engaged condition and the first synchronizer in the first engaged condition causing the output shaft to rotate relative to first range shaft based upon a ratio of the first range gear to the second range gear;

a second mode which includes the high range clutch in the engaged condition and the second synchronizer in the first engaged condition causing the output shaft to rotate relative to second range shaft based upon a ratio of the third range gear to the fourth range gear;

a shift from the first mode to the second mode which includes engaging the second synchronizer in the first engaged condition before disengaging the low range clutch and engaging the high range clutch.

10. The transmission of claim 9, wherein the shift from the first mode to the second mode further includes disengaging the first synchronizer after engaging the high range clutch.

11. The transmission of claim 10 further comprising:
a fifth range gear operably connected to the first range shaft and engaged with a sixth range gear operably connected to the output shaft;

a third synchronizer having a first engaged condition;

a third mode which includes the low range clutch in the engaged condition and the third synchronizer in the first engaged condition causing the output shaft to rotate relative to the first range shaft based upon a ratio of the fifth range gear to the sixth range gear;

a shift from the second mode to the third mode which includes engaging the third synchronizer in the first engaged condition before disengaging the high range clutch and engaging the low range clutch.

12. The transmission of claim 11 further comprising:

a fourth synchronizer having a first engaged condition;

a fourth mode which includes the high range clutch in the engaged condition and the fourth synchronizer in the first engaged condition causing the output shaft to rotate relative to the first range shaft based upon a ratio of the fifth range gear to the sixth range gear;

a shift from the third mode to the fourth mode which includes engaging the fourth synchronizer in the first engaged condition before disengaging the high range clutch and engaging the low range clutch.

13. The transmission of claim 12 further comprising:

a seventh range gear operably connected to the first range shaft and engaged with a eighth range gear operably connected to the output shaft;

a fifth mode which includes the low range clutch in the engaged condition and the first synchronizer in a second engaged condition causing the output shaft to rotate relative to the first range shaft based upon a ratio of the seventh range gear to the eighth range gear;

a shift from the fourth mode to the fifth mode which includes engaging the first synchronizer in the second engaged condition before disengaging the high range clutch and engaging the low range clutch.

14. The transmission of claim 13 further comprising:

a sixth mode which includes the high range clutch in the engaged condition and the second synchronizer in a second engaged condition causing the output shaft to rotate relative to the first range shaft based upon a ratio of the seventh range gear to the eighth range gear;

a shift from the fifth mode to the sixth mode which includes engaging the second synchronizer in the second engaged condition before disengaging the low range clutch and engaging the high range clutch.

* * * * *